(12) United States Patent
Sasaki et al.

(10) Patent No.: US 8,456,968 B1
(45) Date of Patent: Jun. 4, 2013

(54) THERMALLY-ASSISTED MAGNETIC RECORDING HEAD HAVING DUAL HEAT SINK LAYERS

(75) Inventors: Yoshitaka Sasaki, Santa Clara, CA (US); Hiroyuki Ito, Milpitas, CA (US); Hironori Araki, Milpitas, CA (US); Shigeki Tanemura, Milpitas, CA (US); Kazumasa Yasuda, Sunnyvale, CA (US); Ryuji Fujii, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/402,276

(22) Filed: Feb. 22, 2012

(51) Int. Cl.
    *G11B 11/00* (2006.01)
(52) U.S. Cl.
    USPC ..................................... 369/13.33; 369/13.13
(58) Field of Classification Search
    USPC .......... 369/13.33, 13.13, 13.32, 13.02, 13.17,
    369/112.09, 112.14, 112.21, 112.27, 300;
    360/59; 385/129; 29/603.07–603.27; 250/201.3,
    250/201.5
    See application file for complete search history.

(56) References Cited

U.S. PATENT DOCUMENTS

| | | | |
|---|---|---|---|
| 8,248,894 B2* | 8/2012 | Sasaki et al. ............... | 369/13.33 |
| 8,264,920 B1* | 9/2012 | Chou et al. ................. | 369/13.33 |
| 2004/0240327 A1* | 12/2004 | Sendur et al. .............. | 369/13.35 |
| 2010/0309581 A1* | 12/2010 | Wu et al. ................... | 360/123.12 |
| 2011/0170381 A1 | 7/2011 | Matsumoto | |
| 2012/0257304 A1* | 10/2012 | Sasaki et al. ............. | 360/123.12 |

* cited by examiner

*Primary Examiner* — Tan X Dinh
(74) *Attorney, Agent, or Firm* — Oliff & Berridge, PLC

(57) ABSTRACT

A thermally-assisted magnetic recording head includes: a main pole and a plasmon generator disposed to align along the direction of travel of a recording medium; a first heat sink layer having two portions that are located on opposite sides of the plasmon generator in the track width direction; a second heat sink layer having two portions that are located on opposite sides of the main pole in the track width direction; and a nonmagnetic layer disposed between the plasmon generator and the main pole. The first and second heat sink layers are each made of SiC or AlN. The nonmagnetic layer is made of a material that is lower in thermal conductivity at 25° C. than alumina.

6 Claims, 27 Drawing Sheets

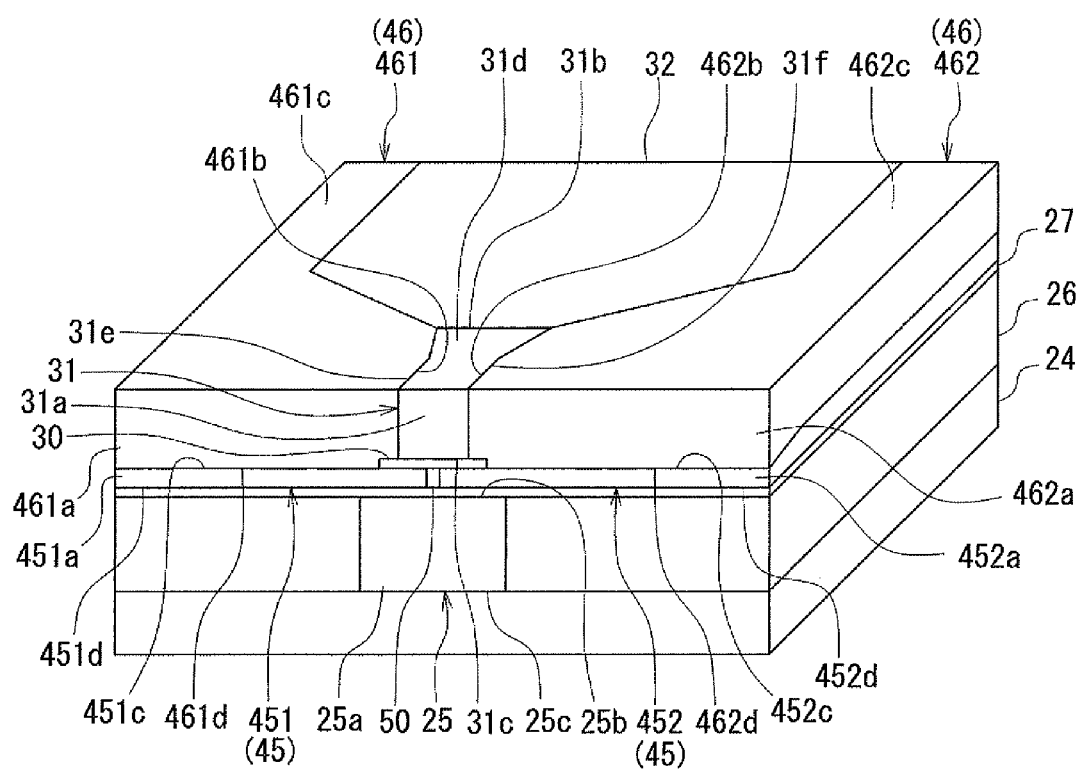
FIG. 14
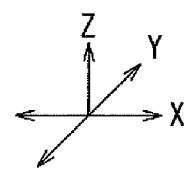

THERMALLY-ASSISTED MAGNETIC RECORDING HEAD HAVING DUAL HEAT SINK LAYERS

BACKGROUND OF THE INVENTION

1. Field of the Invention

The present invention relates to a thermally-assisted magnetic recording head for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

U.S. Patent Application Publication No. 2011/0170381 A1 discloses a technology in which the surface of the core of the waveguide and the surface of the plasmon generator (near-field light generating element) are arranged to face each other with a gap therebetween, so that evanescent light that occurs from the surface of the core based on the light propagating through the core is used to excite surface plasmons on the plasmon generator to generate near-field light based on the excited surface plasmons.

A thermally-assisted magnetic recording head that employs a plasmon generator as a source of generation of near-field light is configured so that the write head section includes the plasmon generator and a main pole that produces a write magnetic field. The plasmon generator and the main pole are located in close proximity to each other.

Part of the energy of the light propagating through the core is transformed into heat in the plasmon generator. This causes the following problems. During the operation of the thermally-assisted magnetic recording head, the temperature of the plasmon generator rises. The heat generated in the plasmon generator is transferred to the main pole disposed in the vicinity of the plasmon generator, thereby causing a rise in temperature of the main pole. This results in expansion of the plasmon generator and the main pole, so that part of the medium facing surface protrudes toward the recording medium. This causes an end of the read head section located in the medium facing surface to get farther from the recording medium, thereby causing the problem that a servo signal cannot be read during write operation. In addition, the rise in temperature of each of the plasmon generator and the main pole may cause corrosion of the plasmon generator and the main pole, and the rise in temperature of the main pole may degrade the magnetic properties of the main pole to cause deterioration of the characteristics of the write head section.

U.S. Patent Application Publication No. 2011/0170381 A1 discloses the following technology for suppressing a rise in temperature of the plasmon generator. Specifically, in the technology, conductive layers are provided on the lateral sides (opposite sides in the track width direction) of the main pole so as to be in contact with the plasmon generator. This publication describes that the conductive layers may be made of a nonmetallic material having a high thermal conductivity such as SiC. According to this technology, the heat generated in the plasmon generator is directly transferred to the conductive layers to enhance the heat dissipation performance of the plasmon generator so that a rise in temperature of the plasmon generator is suppressed. U.S. Patent Application Publication No. 2011/0170381 A1 further discloses employing SiC as the material of parts around the plasmon generator.

The technology disclosed in U.S. Patent Application Publication No. 2011/0170381 A1 makes it possible to suppress a rise in temperature of the plasmon generator. However, the problem with this technology is that heat is easily transferred from the plasmon generator to the main pole directly, so that it is difficult to protect the main pole from the heat generated by the plasmon generator.

OBJECT AND SUMMARY OF THE INVENTION

It is an object of the present invention to provide a thermally-assisted magnetic recording head that is capable of suppressing a rise in temperature of each of the plasmon generator and the main pole and allows the main pole to be protected from heat generated by the plasmon generator.

A thermally-assisted magnetic recording head of the present invention includes: a medium facing surface that faces a recording medium; a main pole that produces a write magnetic field for writing data on the recording medium; a waveguide; and a plasmon generator. The waveguide includes a core through which light propagates, and a cladding that surrounds the core. The plasmon generator is configured to excite a surface plasmon through coupling with evanescent light that occurs from the core based on the light propagating through the core. The plasmon generator and the main pole are disposed to align along the direction of travel of the recording medium.

The thermally-assisted magnetic recording head of the present invention further includes: a first heat sink layer having two portions that are located on opposite sides of the plasmon generator in the track width direction; a second heat sink layer having two portions that are located on opposite sides of the main pole in the track width direction; and a nonmagnetic layer disposed between the plasmon generator and the main pole. The first and second heat sink layers are each made of SiC or AlN. The nonmagnetic layer is made of a material that is lower in thermal conductivity at 25° C. than alumina.

In the thermally-assisted magnetic recording head of the present invention, the second heat sink layer may be in contact with the first heat sink layer.

In the thermally-assisted magnetic recording head of the present invention, the nonmagnetic layer may be made of $SiO_2$.

In the thermally-assisted magnetic recording head of the present invention, the first heat sink layer may be made of SiC. In this case, the thermally-assisted magnetic recording head further includes an insulating film disposed between the plasmon generator and the first heat sink layer. The insulating film may be made of alumina.

In the thermally-assisted magnetic recording head of the present invention, the first heat sink layer may be made of AlN. In this case, the first heat sink layer may be in contact with the plasmon generator.

According to the thermally-assisted magnetic recording head of the present invention, since there are provided the first and second heat sink layers each made of SiC or AlN, it is possible to suppress a rise in temperature of each of the plasmon generator and the main pole. Furthermore, according to the invention, since the nonmagnetic layer that is made of a material lower in thermal conductivity at 25° C. than alumina is provided between the plasmon generator and the main pole, it is possible to suppress direct heat transfer from the plasmon generator to the main pole, and consequently, it is possible to protect the main pole from the heat generated by the plasmon generator.

Other and further objects, features and advantages of the present invention will appear more fully from the following description.

BRIEF DESCRIPTION OF THE DRAWINGS

FIG. 14 is a perspective view showing the main part of a thermally-assisted magnetic recording head of a modification example of the first embodiment of the invention.

DETAILED DESCRIPTION OF THE PREFERRED EMBODIMENTS

First Embodiment

Figure 1:
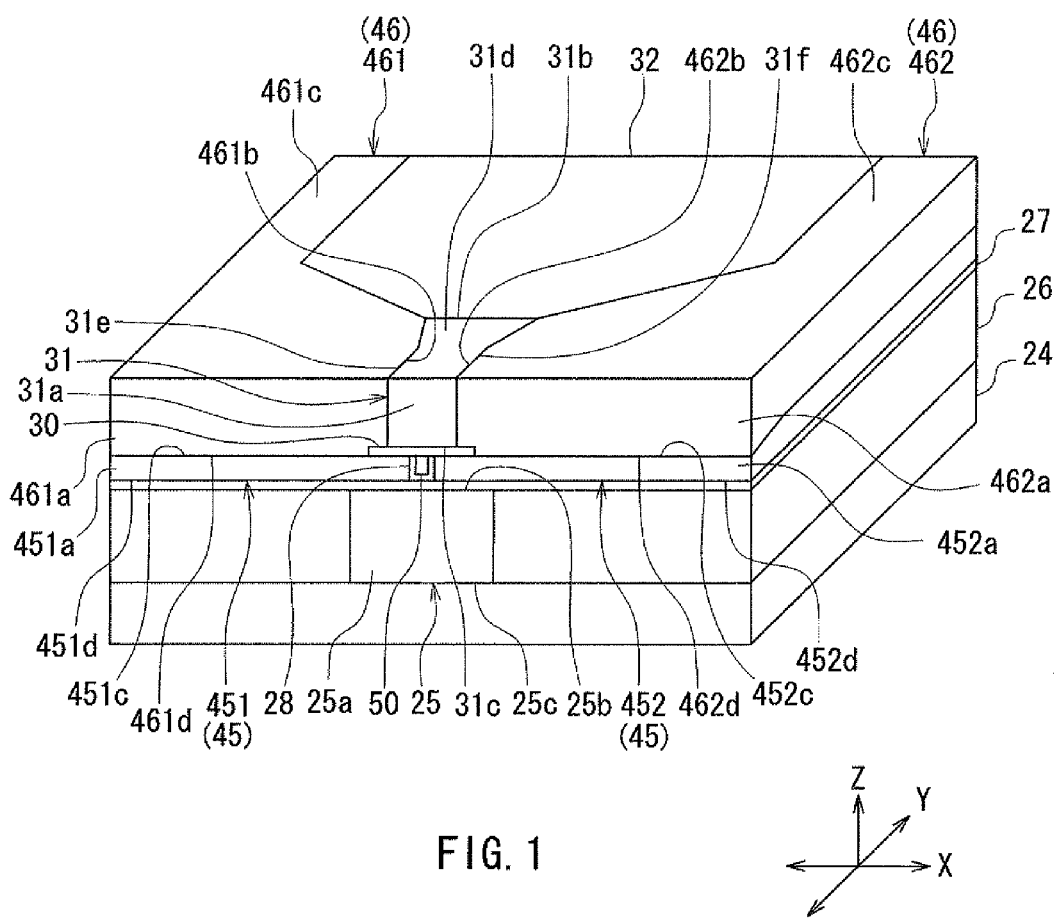
FIG. 1 is a perspective view showing the main part of a thermally-assisted magnetic recording head according to a first embodiment of the invention.
Figure 2:
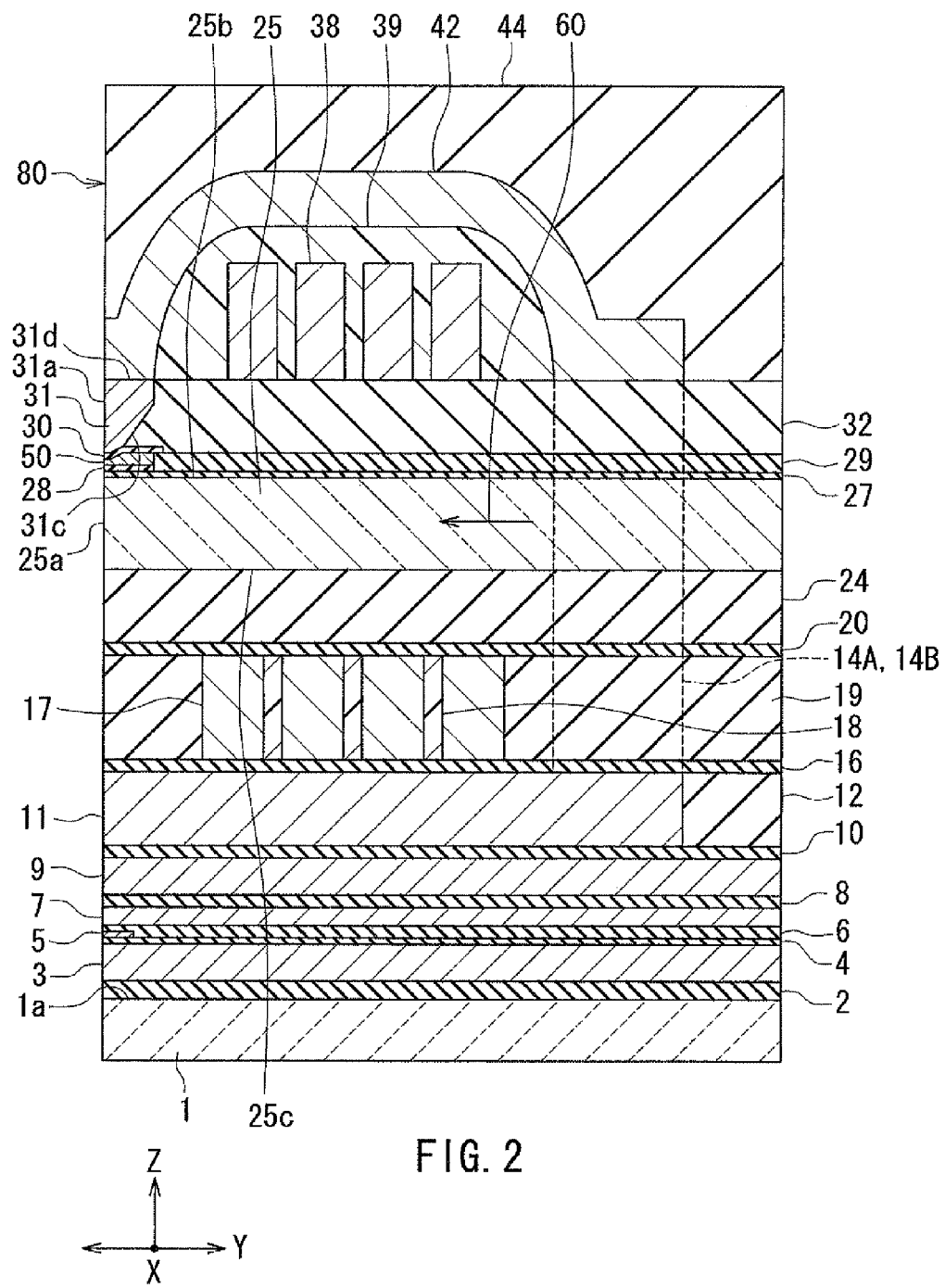
FIG. 2 is a cross-sectional view showing the configuration of the thermally-assisted magnetic recording head according to the first embodiment of the invention.
Figure 3:
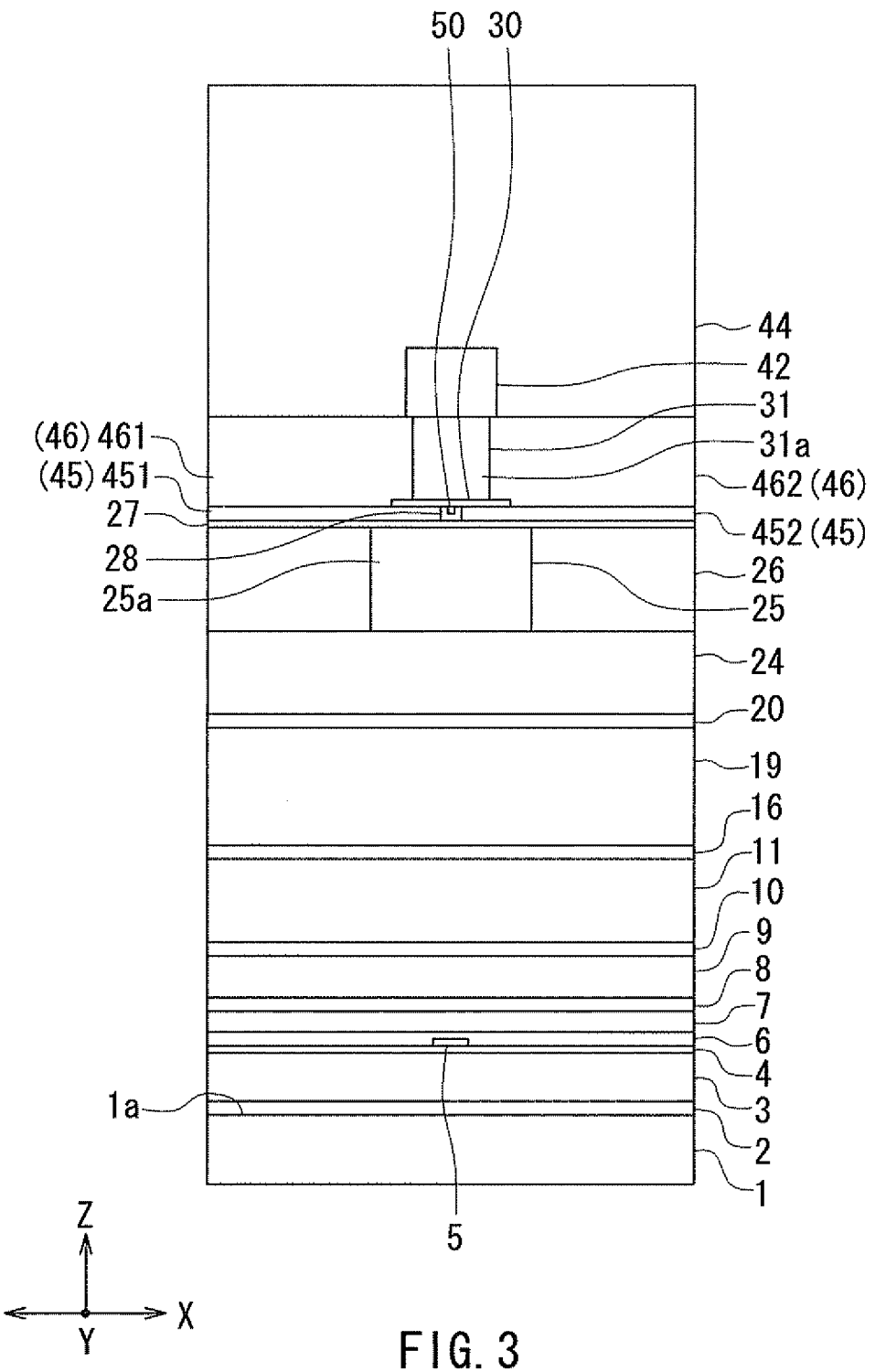
FIG. 3 is a front view showing the medium facing surface of the thermally-assisted magnetic recording head according to the first embodiment of the invention.
Figure 4:
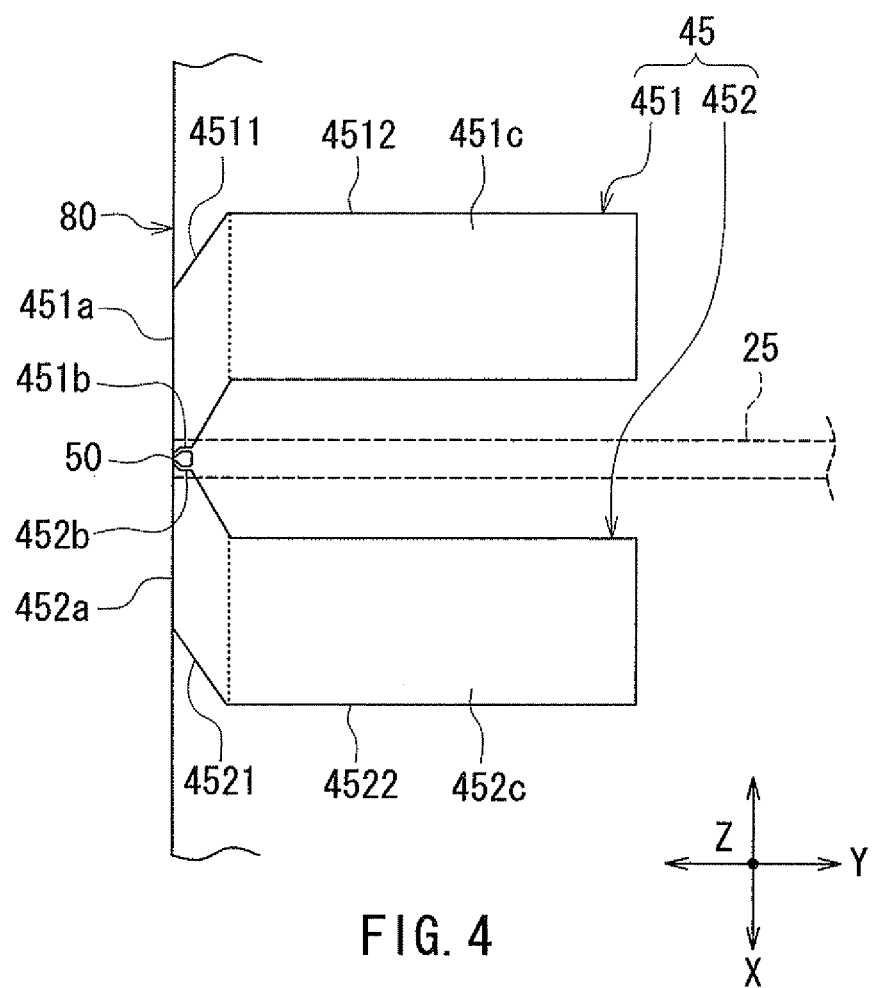
FIG. 4 is a plan view showing a first heat sink layer of the first embodiment of the invention.
Figure 5:
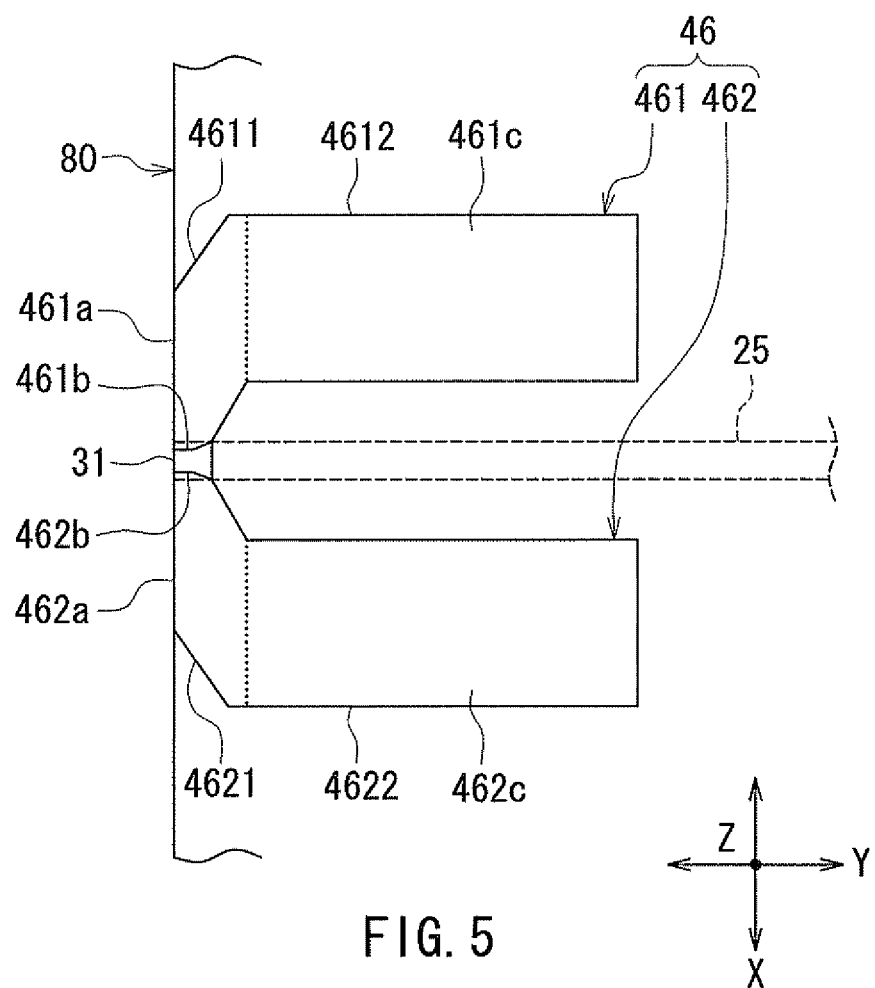
FIG. 5 is a plan view showing a second heat sink layer of the first embodiment of the invention.

Preferred embodiments of the present invention will now be described in detail with reference to the drawings. First, reference is made to FIG. 1 to FIG. 5 to describe the configuration of a thermally-assisted magnetic recording head according to a first embodiment of the invention. FIG. 1 is a perspective view showing the main part of the thermally-assisted magnetic recording head. FIG. 2 is a cross-sectional view showing the configuration of the thermally-assisted magnetic recording head. FIG. 3 is a front view showing the medium facing surface of the thermally-assisted magnetic recording head. FIG. 4 is a plan view showing a first heat sink layer. FIG. 5 is a plan view showing a second heat sink layer.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium facing surface 80 that faces the recording medium. Here, X direction, Y direction, and Z direction will be defined as follows. The X direction is the direction across the tracks of the recording medium, i.e., the track width direction. The Y direction is a direction perpendicular to the medium facing surface 80. The Z direction is the direction of travel of the recording medium as viewed from the slider. The X, Y, and Z directions are orthogonal to one another.

As shown in FIG. 2 and FIG. 3, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 80 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 made of a magnetic material and disposed on the insulating layer 8, and a nonmagnetic layer 10 made of a nonmagnetic material and disposed on the middle shield layer 9. The insulating layer 8 and the nonmagnetic layer 10 are made of alumina, for example.

The thermally-assisted magnetic recording head further includes a return pole layer 11 made of a magnetic material and disposed on the nonmagnetic layer 10, and an insulating layer 12 disposed on the nonmagnetic layer 10 and surrounding the return pole layer 11. The return pole layer 11 has an end face located in the medium facing surface 80. The insulating layer 12 is made of alumina, for example.

The thermally-assisted magnetic recording head further includes: two coupling portions 14A and 14B disposed away from the medium facing surface 80 and lying on part of the return pole layer 11; an insulating layer 16 disposed on another part of the return pole layer 11 and on the insulating layer 12; and a coil 17 disposed on the insulating layer 16. The coupling portions 14A and 14B are made of a magnetic material. Each of the coupling portions 14A and 14B has a first layer located on the return pole layer 11, and a second, a third, and a fourth layer stacked in this order on the first layer. The first layer of the coupling portion 14A and the first layer of the coupling portion 14B are disposed to align in the track width direction (the X direction). The coil 17 is planar spiral-shaped and wound around the first layers of the coupling portions 14A and 14B. The coil 17 is made of a conductive material such as copper. The insulating layer 16 is made of alumina, for example.

The thermally-assisted magnetic recording head further includes an insulating layer 18 disposed in the space between every adjacent turns of the coil 17, an insulating layer 19 disposed around the coil 17, and an insulating layer 20 disposed over the coil 17 and the insulating layers 18 and 19. The insulating layer 18 is made of photoresist, for example. The insulating layers 19 and 20 are made of alumina, for example. The first layers of the coupling portions 14A and 14B are embedded in the insulating layers 16 and 19.

The thermally-assisted magnetic recording head further includes a waveguide including a core 25 and a cladding. The cladding surrounds the core 25. The core 25 has an end face 25a that is closer to the medium facing surface 80, and further has a top surface 25b and a bottom surface 25c. The end face 25a may be located in the medium facing surface 80 or at a distance from the medium facing surface 80. FIG. 1 to FIG. 3 illustrate an example in which the end face 25a is located in the medium facing surface 80.

The cladding includes cladding layers 24 and 26 and a gap layer 27. The cladding layer 24 is disposed on the insulating layer 20. The core 25 is disposed on the cladding layer 24. The cladding layer 26 is disposed on the cladding layer 24 and surrounds the core 25. The top surface 25b of the core 25 and the top surface of the cladding layer 26 are even with each other. The gap layer 27 is disposed over the top surface 25b of the core 25 and the top surface of the cladding layer 26.

The core 25 is made of a dielectric material that transmits laser light to be used for generating near-field light. The laser light emitted from a not-shown laser diode enters the core 25 and propagates through the core 25. The core 25 has an evanescent light generating surface that generates evanescent light based on the light propagating through the core 25. In the present embodiment, the top surface 25b of the core 25 corresponds to the evanescent light generating surface according to the invention.

The cladding layers 24 and 26 and the gap layer 27 are each made of a dielectric material that has a refractive index lower than that of the core 25.

For example, the core 25 can be made of tantalum oxide such as $Ta_2O_5$ or silicon oxynitride (SiON), whereas the cladding layers 24 and 26 and the gap layer 27 can be made of silicon dioxide ($SiO_2$) or alumina.

The second layers of the coupling portions 14A and 14B are embedded in the insulating layer 20 and the cladding layer 24. The third layers of the coupling portions 14A and 14B are embedded in the cladding layer 26. The third layer of the coupling portion 14A and the third layer of the coupling portion 14B are located on opposite sides of the core 25 in the track width direction (the X direction) and are each spaced from the core 25.

The thermally-assisted magnetic recording head further includes: a first heat sink layer 45 disposed on the gap layer 27; a plasmon generator 50 disposed above the top surface 25b of the core 25 in the vicinity of the medium facing surface 80; and an insulating film 28 disposed between the plasmon generator 50 and each of the first heat sink layer 45 and the gap layer 27.

The first heat sink layer 45 is made of SiC or AlN. Both SiC and AlN are materials that are higher in thermal conductivity at 25° C. than alumina which forms a major part of the thermally-assisted magnetic recording head 1 excluding the substrate 1. Alumina has a thermal conductivity of approximately 30 W/m·K at 25° C. SiC has a thermal conductivity of approximately 75 W/m·K at 25° C. AlN has a thermal conductivity of approximately 170 W/m·K at 25° C. FIG. 1 to FIG. 4 illustrate an example in which the first heat sink layer 45 is made of SiC, in particular.

For example, the plasmon generator 50 is made of one of Au, Ag, Al, Cu, Pd, Pt, Rh and Ir, or of an alloy composed of two or more of these elements. The insulating film 28 is made of alumina, for example. A detailed description will be made later as to the shape of the plasmon generator 50.

As shown in FIG. 1, FIG. 3, and FIG. 4, the first heat sink layer 45 has two portions 451 and 452 that are located on opposite sides of the plasmon generator 50 in the track width direction (the X direction). The portion 451 has a front end face 451a located in the medium facing surface 80, a side end face 451b facing toward the plasmon generator 50, a top surface 451c, and a bottom surface 451d. The portion 452 has a front end face 452a located in the medium facing surface 80, a side end face 452b facing toward the plasmon generator 50, a top surface 452c, and a bottom surface 452d.

The portion 451 includes a front section 4511 and a rear section 4512. The rear section 4512 is located farther from the medium facing surface 80 than is the front section 4511. The front section 4511 includes the front end face 451a and the side end face 451b, and has a rear end opposite to the front end face 451a. The rear section 4512 is connected to the rear end of the front section 4511 and extends in the direction perpendicular to the medium facing surface 80 (the Y direction). Likewise, the portion 452 includes a front section 4521 and a rear section 4522. The rear section 4522 is located farther from the medium facing surface 80 than is the front section 4521. The front section 4521 includes the front end face 452a and the side end face 452b, and has a rear end opposite to the front end face 452a. The rear section 4522 is connected to the rear end of the front section 4521 and extends in the direction perpendicular to the medium facing surface 80 (the Y direction). In FIG. 4, the boundary between the front section 4511 and the rear section 4512 and the boundary between the front section 4521 and the rear section 4522 are shown by dotted lines. As viewed from above, the rear section 4512 and the rear section 4522 are located on opposite sides of the core 25 in the track width direction and are sufficiently apart from the core 25.

The thermally-assisted magnetic recording head further includes a dielectric layer 29 disposed on the gap layer 27 and surrounding the plasmon generator 50, the first heat sink layer 45 and the insulating film 28. The dielectric layer 29 is made of $SiO_2$, for example.

The thermally-assisted magnetic recording head further includes a main pole 31 made of a magnetic material and disposed such that the plasmon generator 50 is interposed between the main pole 31 and the core 25, and a nonmagnetic layer 30 disposed between the plasmon generator 50 and the main pole 31. The nonmagnetic layer 30 is made of a material that is lower in thermal conductivity at 25° C. than alumina. Specific examples of the material for the nonmagnetic layer 30 include $SiO_2$, $3Al_2O_3 \cdot 2SiO_2$ (mullite), $2MgO$—$SiO_2$ (forsterite), $MgO$—$SiO_2$ (steatite), and $ZrO_2$ (zirconia). The nonmagnetic layer 30 is preferably made of $SiO_2$ which has a thermal conductivity of approximately 1 W/m·K at 25° C. The shape of the main pole 31 will be described in detail later.

The thermally-assisted magnetic recording head further includes a second heat sink layer 46 disposed on the first heat sink layer 45, and a dielectric layer 32 disposed around the main pole 31 and the second heat sink layer 46. The fourth layers of the coupling portions 14A and 14B are embedded in the gap layer 27 and the dielectric layers 29 and 32. The top surfaces of the main pole 31, the second heat sink layer 46, the dielectric layer 32, and the fourth layers of the coupling portions 14A and 14B are even with each other. The second heat sink layer 46 is made of SiC or AlN. The dielectric layer 32 is made of $SiO_2$, for example.

As shown in FIG. 1, FIG. 3, and FIG. 5, the second heat sink layer 46 has two portions 461 and 462 that are located on opposite sides of the main pole 31 in the track width direction (the X direction). The portion 461 has a front end face 461a located in the medium facing surface 80, a side end face 461b in contact with the main pole 31, a top surface 461c, and a bottom surface 461d. The portion 462 has a front end face 462a located in the medium facing surface 80, a side end face 462b in contact with the main pole 31, a top surface 462c, and a bottom surface 462d. In the present embodiment, the second heat sink layer 46 is in contact with the first heat sink layer 45. More specifically, the bottom surface 461d of the portion 461 of the second heat sink layer 46 is in contact with the top surface 451c of the portion 451 of the first heat sink layer 45, and the bottom surface 462d of the portion 462 of the second heat sink layer 46 is in contact with the top surface 452c of the portion 452 of the first heat sink layer 45.

The portion 461 includes a front section 4611 and a rear section 4612. The rear section 4612 is located farther from the medium facing surface 80 than is the front section 4611. The front section 4611 includes the front end face 461a and the side end face 461b, and has a rear end opposite to the front end face 461a. The rear section 4612 is connected to the rear end of the front section 4611 and extends in the direction perpendicular to the medium facing surface 80 (the Y direction). Likewise, the portion 462 includes a front section 4621 and a rear section 4622. The rear section 4622 is located farther from the medium facing surface 80 than is the front section 4621. The front section 4621 includes the front end face 462a and the side end face 462b, and has a rear end opposite to the front end face 462a. The rear section 4622 is connected to the rear end of the front section 4621 and extends in the direction perpendicular to the medium facing surface 80 (the Y direction). In FIG. 5, the boundary between the front section 4611 and the rear section 4612 and the boundary between the front section 4621 and the rear section 4622 are shown by dotted lines. As viewed from above, the rear section 4612 and the rear section 4622 are located on opposite sides of the core 25 in the track width direction and are sufficiently apart from the core 25.

The thermally-assisted magnetic recording head further includes a coil 38 disposed on the dielectric layer 32, an insulating layer 39 disposed to cover the coil 38, and a yoke layer 42 made of a magnetic material and disposed over the main pole 31, the coupling portions 14A and 14B, the dielectric layer 32 and the insulating layer 39. The yoke layer 42 magnetically couples the main pole 31 to the coupling portions 14A and 14B. The coil 38 is planar spiral-shaped and wound around part of the yoke layer 42 lying on the coupling portions 14A and 14B. The coil 38 is made of a conductive material such as copper. The insulating layer 39 is made of photoresist, for example.

The thermally-assisted magnetic recording head further includes a protective layer 44 disposed to cover the yoke layer 42. The protective layer 44 is made of alumina, for example.

The parts from the return pole layer 11 to the yoke layer 42 constitute a write head section. The coils 17 and 38 produce magnetic fields corresponding to data to be written on the recording medium. The return pole layer 11, the coupling portions 14A and 14B, the yoke layer 42, and the main pole 31 form a magnetic path for passing magnetic fluxes corresponding to the magnetic fields produced by the coils 17 and 38. The coils 17 and 38 are connected in series or in parallel so that the magnetic flux corresponding to the magnetic field produced by the coil 17 and the magnetic flux corresponding to the magnetic field produced by the coil 38 flow in the same direction through the main pole 31. The main pole 31 allows the magnetic flux corresponding to the magnetic field produced by the coil 17 and the magnetic flux corresponding to the magnetic field produced by the coil 38 to pass, and produces a write magnetic field for writing data on the recording medium by means of a perpendicular magnetic recording system.

As has been described, the thermally-assisted magnetic recording head according to the present embodiment includes the medium facing surface 80, the read head section, and the write head section. The medium facing surface 80 faces the recording medium. The read head section and the write head section are stacked on the substrate 1. Relative to the read head section, the write head section is located forward in the direction of travel of the recording medium (the Z direction) (i.e., located on the trailing side).

The read head section includes: the MR element 5 serving as the read element; the bottom shield layer 3 and the top shield layer 7 for shielding the MR element 5, the bottom shield layer 3 and the top shield layer 7 having their respective portions that are located near the medium facing surface 80 and are opposed to each other with the MR element 5 therebetween; the bottom shield gap film 4 disposed between the MR element 5 and the bottom shield layer 3; and the top shield gap film 6 disposed between the MR element 5 and the top shield layer 7.

The write head section includes the coils 17 and 38, the main pole 31, the waveguide, and the plasmon generator 50. The waveguide includes the core 25 through which light propagates, and the cladding surrounding the core 25. In the present embodiment, in particular, the core 25 allows laser light emitted from a not-shown laser diode to propagate therethrough. The cladding includes the cladding layers 24 and 26 and the gap layer 27.

The core 25 has the top surface 25b. The plasmon generator 50 is disposed above the top surface 25b of the core 25. The plasmon generator 50 and the main pole 31 are disposed to align along the direction of travel of the recording medium (the Z direction). In the present embodiment, in particular, the main pole 31 is located forward of the plasmon generator 50 in the direction of travel of the recording medium (the Z direction).

Figure 6:
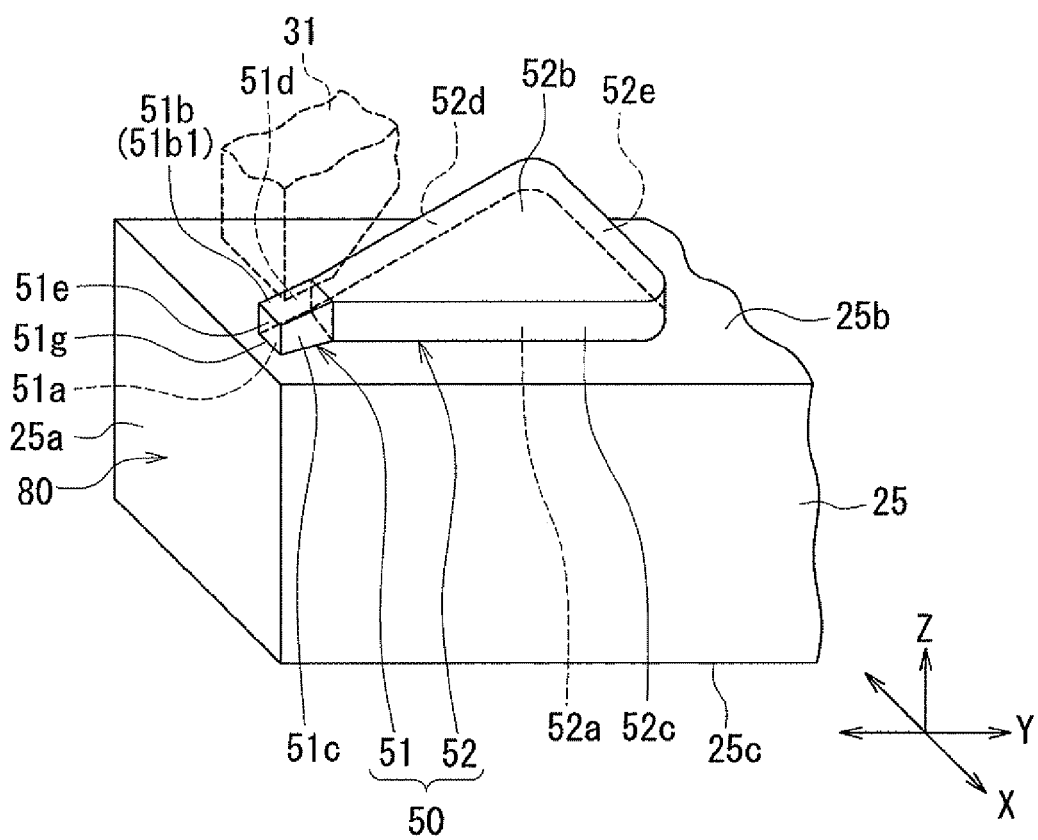
FIG. 6 is a perspective view showing a plasmon generator of the first embodiment of the invention.

Reference is now made to FIG. 1, FIG. 2, FIG. 4, and FIG. 6 to describe an example of the shape of the plasmon generator 50 in detail. FIG. 6 is a perspective view showing the plasmon generator 50. Note that FIG. 6 omits the illustration of the gap layer 27, the insulating film 28 and the first heat sink layer 45. As shown in FIG. 6, the plasmon generator 50 includes a propagation part 51 that is located near the medium facing surface 80, and a width changing portion 52 that is located farther from the medium facing surface 80 than is the propagation part 51.

The propagation part 51 has: a bottom surface 51a; a top surface 51b opposite to the bottom surface 51a; a first side surface 51c and a second side surface 51d opposite to each other and connecting the bottom surface 51a and the top surface 51b to each other; and a front end face 51e located in the medium facing surface 80 and connecting the bottom surface 51a, the top surface 51b, the first side surface 51c, and the second side surface 51d to each other.

The bottom surface 51a is parallel to the top surface 1a of the substrate 1, and faces the top surface 25b of the core 25 with a predetermined spacing therebetween. The first side surface 51c faces toward the side end face 451b of the portion 451 of the first heat sink layer 45. The second side surface 51d faces toward the side end face 452b of the portion 452 of the first heat sink layer 45. Part of the insulating film 28 is interposed between the first side surface 51c and the side end face 451b, and between the second side surface 51d and the side end face 452b. The front end face 51e includes a near-field light generating part 51g that lies at an end of the bottom surface 51a and generates near-field light based on surface plasmons.

The top surface 51b includes an inclined portion 51b1. The distance from the bottom surface 51a of the propagation part 51 to an arbitrary point on the inclined portion 51b1 decreases with decreasing distance from the arbitrary point to the front end face 51e. The top surface 51b may include a flat portion that is located closer to or farther from the medium facing surface 80 than is the inclined portion 51b1 and contiguous with the inclined portion 51b1. The flat portion is parallel to the bottom surface 51a.

For example, the propagation part 51 is rectangular in cross section parallel to the medium facing surface 80. The width of the propagation part 51 in a direction parallel to the medium facing surface 80 and the top surface 1a of the substrate 1 (the X direction) may be constant regardless of the distance from the medium facing surface 80 or may decrease with increasing proximity to the medium facing surface 80. The width (the dimension in the track width direction (the X direction)) of the front end face 51e is defined by the width of the propagation part 51 in the medium facing surface 80. The width of the front end face 51e falls within the range of 5 to 40 nm, for example. The height (the dimension in the Z direction) of the front end face 51e is defined by the height of the propagation part 51 in the medium facing surface 80. The height of the front end face 51e falls within the range of 5 to 40 nm, for example.

The width changing portion 52 is located on a side of the propagation part 51 farther from the front end face 51e and is connected to the propagation part 51. The width changing portion 52 has: a bottom surface 52a; a top surface 52b opposite to the bottom surface 52a; a first side surface 52c and a second side surface 52d opposite to each other and connecting the bottom surface 52a and the top surface 52b to each other; and a rear end face 52e connecting the bottom surface 52a, the top surface 52b, the first side surface 52c, and the second side surface 52d to each other.

The bottom surface 52a is located farther from the medium facing surface 80 than is the bottom surface 51a of the propagation part 51, and is contiguous with the bottom surface 51a. The top surface 52b is located farther from the medium facing surface 80 than is the top surface 51b of the propagation part 51, and is contiguous with the top surface 51b. The first side surface 52c is located farther from the medium facing surface 80 than is the first side surface 51c of the propagation part 51, and is contiguous with the first side surface 51c. The second side surface 52d is located farther from the medium facing surface 80 than is the second side surface 51d of the propagation part 51, and is contiguous with the second side surface 51d.

The bottom surface 52a is parallel to the top surface 1a of the substrate 1, and faces the top surface 25b of the core 25 with a predetermined spacing therebetween. The first side surface 52c faces toward the side end face 451b of the portion 451 of the first heat sink layer 45. The second side surface 52d faces toward the side end face 452b of the portion 452 of the first heat sink layer 45. Another part of the insulating film 28 is interposed between the first side surface 52c and the side end face 451b, and between the second side surface 52d and the side end face 452b.

For example, the width changing portion 52 is rectangular in cross section parallel to the medium facing surface 80. The width changing portion 52 has a width in a direction parallel to the bottom surface 51a and the front end face 51e of the propagation part 51 (the same direction as the direction parallel to the medium facing surface 80 and the top surface 1a of the substrate 1). The width of the width changing portion 52 decreases with increasing proximity to the front end face 51e, and becomes equal to the width of the propagation part 51 at the boundary with the propagation part 51. The width of the bottom surface 52a of the width changing portion 52 facing the top surface 25b of the core 25 decreases with increasing proximity to the medium facing surface 80, and becomes equal to the width of the bottom surface 51a of the propagation part 51 at the boundary with the bottom surface 51a.

An example of the shape of the main pole 31 will now be described with reference to FIG. 1, FIG. 2, and FIG. 5. The main pole 31 has a first end face 31a located in the medium facing surface 80, a second end face 31b opposite to the first end face 31a, a bottom surface 31c, a top surface 31d, and two side surfaces 31e and 31f. A portion of the bottom surface 31c is opposed to the inclined portion 51b1 of the top surface 51b of the propagation part 51 with the nonmagnetic layer 30 interposed therebetween. The distance from the top surface 1a of the substrate 1 to an arbitrary point on the bottom surface 31c increases with increasing distance from the arbitrary point to the medium facing surface 80. The side surface 31e is in contact with the side end face 461b of the portion 461 of the second heat sink layer 46. The side surface 31f is in contact with the side end face 462b of the portion 462 of the second heat sink layer 46.

Note that the shapes of the plasmon generator 50 and the main pole 31 are not limited to the foregoing example described with reference to FIGS. 1, 2, 4, 5, and 6.

Now, the principle of generation of near-field light in the present embodiment and the principle of thermally-assisted magnetic recording using the near-field light will be described in detail. Laser light emitted from a not-shown laser diode enters the core 25. As shown in FIG. 2, the laser light 60 propagates through the core 25 toward the medium facing surface 80, and reaches the vicinity of the plasmon generator 50. The plasmon generator 50 is configured to excite surface plasmons through coupling with evanescent light that occurs from the core 25 based on the light propagating through the core 25. More specifically, the plasmon generator 50 has a plasmon exciting part that faces the evanescent light generating surface (the top surface 25b) of the core 25 with a predetermined spacing therebetween. In the present embodiment, the plasmon exciting part is composed of the bottom surface 51a of the propagation part 51 and the bottom surface 52a of the width changing portion 52. In the core 25, the laser light 60 is totally reflected at the evanescent light generating surface (the top surface 25b) to generate evanescent light permeating into the gap layer 27. Surface plasmons are then excited at least on the bottom surface 52a of the width changing portion 52 of the plasmon exciting part of the plasmon generator 50 through coupling with the evanescent light.

The surface plasmons excited on the bottom surface 52a of the width changing portion 52 propagate through the bottom surface 52a to reach the bottom surface 51a of the propagation part 51, and further propagate through the bottom surface 51a to reach the near-field light generating part 51g. Consequently, the surface plasmons concentrate at the near-field light generating part 51g, and the near-field light generating part 51g generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 31 for data writing.

Now, with reference to FIG. 2 and FIG. 3, a description will be given of a method of manufacturing the thermally-assisted magnetic recording head according to the present embodiment. The method of manufacturing the thermally-assisted magnetic recording head according to the present embodiment includes the steps of forming components of a plurality of thermally-assisted magnetic recording heads, except the substrates 1, on a substrate that includes portions to become the substrates 1 of the plurality of thermally-assisted magnetic recording heads, thereby fabricating a substructure including a plurality pre-head portions aligned in a plurality of rows, the plurality of pre-head portions being intended to become individual thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 80.

The method of manufacturing the thermally-assisted magnetic recording head according to the present embodiment will now be described in more detail with attention focused on a single thermally-assisted magnetic recording head. The method of manufacturing the thermally-assisted magnetic recording head according to the present embodiment forms the insulating layer 2, the bottom shield layer 3, and the bottom shield gap film 4 in this order on the substrate 1 first. Next, the MR element 5 and not-shown two leads connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Next, the return pole layer 11 is formed on the nonmagnetic layer 10. Then, the insulating layer 12 is formed to cover the return pole layer 11. The insulating layer 12 is then polished by, for example, chemical mechanical polishing (hereinafter referred to as CMP), until the return pole layer 11 is exposed. Next, the insulating layer 16 is formed over the return pole layer 11 and the insulating layer 12.

The insulating layer 16 is then selectively etched to form therein two openings for exposing the top surface of the return pole layer 11. In the positions of these two openings, the first layers of the coupling portions 14A and 14B are then formed on the return pole layer 11. Next, the coil 17 is formed on the insulating layer 16. The insulating layer 18 is then formed in the space between every adjacent turns of the coil 17. Next, the insulating layer 19 is formed over the entire top surface of the stack. The insulating layer 19 is then polished by, for example, CMP, until the first layers of the coupling portions 14A and 14B, the coil 17, and the insulating layer 18 are exposed. Next, the insulating layer 20 is formed over the first layers of the coupling portions 14A and 14B, the coil 17, and the insulating layers 18 and 19.

The insulating layer 20 is then selectively etched to form therein two openings for exposing the top surfaces of the first layers of the coupling portions 14A and 14B. Next, the second layers of the coupling portions 14A and 14B are formed on the first layers of the coupling portions 14A and 14B. Next, the cladding layer 24 is formed to cover the second layers of the coupling portions 14A and 14B. The cladding layer 24 is then polished by, for example, CMP, until the second layers of the coupling portions 14A and 14B are exposed.

Next, the third layers of the coupling portions 14A and 14B are formed on the second layers of the coupling portions 14A and 14B. The core 25 is then formed on the cladding layer 24. Next, the cladding layer 26 is formed over the entire top surface of the stack. The cladding layer 26 is then polished by, for example, CMP, until the third layers of the coupling portions 14A and 14B and the core 25 are exposed. Next, the gap layer 27 is formed over the third layers of the coupling portions 14A and 14B, the core 25, and the cladding layer 26.

The insulating film 28, the dielectric layers 29 and 32, the nonmagnetic layer 30, the main pole 31, the first heat sink layer 45, the second heat sink layer 46, and the plasmon generator 50 are then formed. This process will be described in detail later.

Next, the gap layer 27 and the dielectric layers 29 and 32 are selectively etched to form therein two openings for exposing the top surfaces of the third layers of the coupling portions 14A and 14B. The fourth layers of the coupling portions 14A and 14B are then formed on the third layers of the coupling portions 14A and 14B.

Next, the coil 38 is formed on the dielectric layer 32. The insulating layer 39 is then formed to cover the coil 38. Next, the yoke layer 42 is formed over the main pole 31, the fourth layers of the coupling portions 14A and 14B, the dielectric layer 32, and the insulating layer 39. Next, the protective layer 44 is formed to cover the yoke layer 42. Wiring, terminals, and other components are then formed on the top surface of the protective layer 44.

When the substructure is completed thus, the substructure is cut to separate the plurality of pre-head portions from each other, followed by the polishing of the medium facing surface 80 and the fabrication of flying rails etc. This completes the thermally-assisted magnetic recording head.

Reference is now made to FIG. 7 to FIG. 13 to describe the process for forming the insulating film 28, the dielectric layers 29 and 32, the nonmagnetic layer 30, the main pole 31, the first heat sink layer 45, the second heat sink layer 46, and the plasmon generator 50 in detail. FIG. 7 to FIG. 13 are cross-sectional views each showing a stack of layers formed in the process of manufacturing the thermally-assisted magnetic recording head. FIG. 7 to FIG. 13 each show a cross section of the stack taken in the position where the medium facing surface 80 is to be formed.

Figure 7:
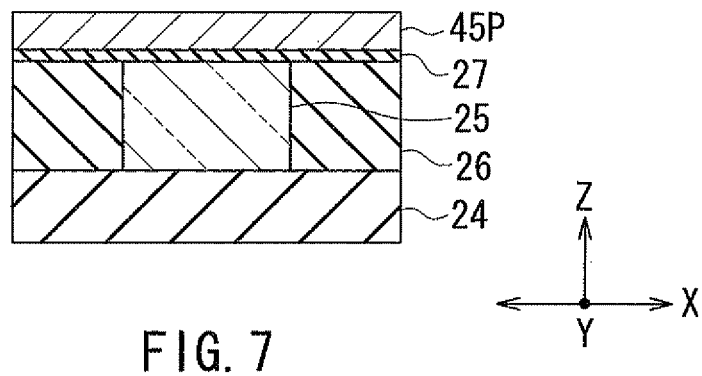
FIG. 7 is a cross-sectional view showing a step of a method of manufacturing the thermally-assisted magnetic recording head according to the first embodiment of the invention.

FIG. 7 shows a step that follows the formation of the gap layer 27. In this step, a first heat sink material layer 45P, which is to become the first heat sink layer 45 later, is formed on the gap layer 27.

Figure 8:
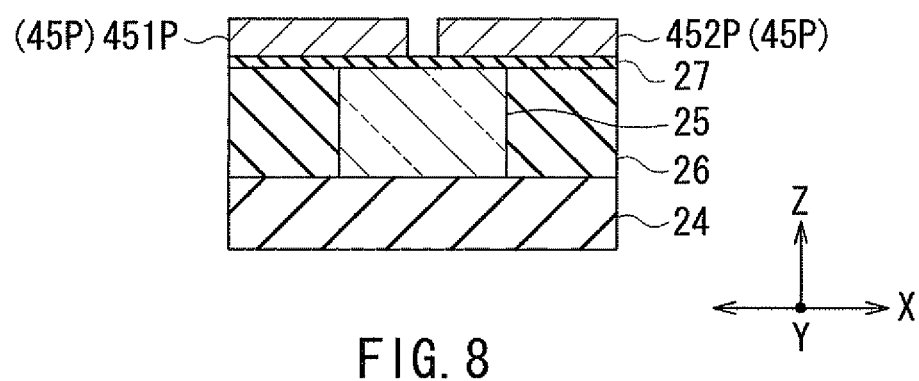
FIG. 8 is a cross-sectional view showing a step that follows the step shown in FIG. 7.

FIG. 8 shows the next step. In this step, first, a not-shown photoresist mask is formed on the first heat sink material layer 45P. The planar shape of the photoresist mask corresponds to the planar shape of the two portions 451 and 452 of the first heat sink layer 45 to be formed later. The photoresist mask is formed by patterning a photoresist layer by photolithography. The first heat sink material layer 45P is then etched by, for example, reactive ion etching (hereinafter referred to as RIE), using the photoresist mask as the etching mask. This divides the first heat sink material layer 45P into two portions 451P and 452P. The gap layer 27 functions as an etching stopper for stopping the etching when the first heat sink material layer 45P is etched by RIE. Then, the photoresist mask is removed.

Figure 9:
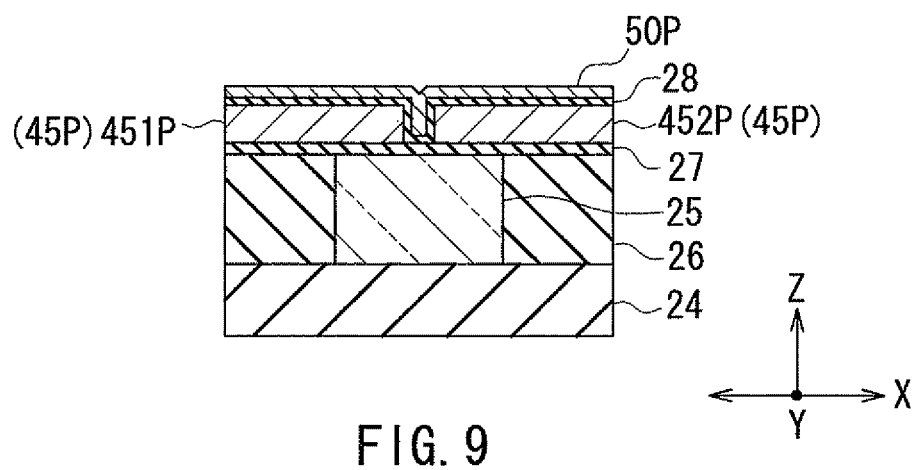
FIG. 9 is a cross-sectional view showing a step that follows the step shown in FIG. 8.

FIG. 9 shows the next step. In this step, first, a not-shown photoresist mask is formed on the stack shown in FIG. 8. The photoresist mask has an opening in the vicinity of the position where the medium facing surface 80 is to be formed. Next, the insulating film 28 is formed over the entire top surface of the stack. A metal film 50P, which is to become the plasmon generator 50 later, is then formed over the entire top surface of the stack by sputtering, for example. The photoresist mask is then removed.

Figure 10:
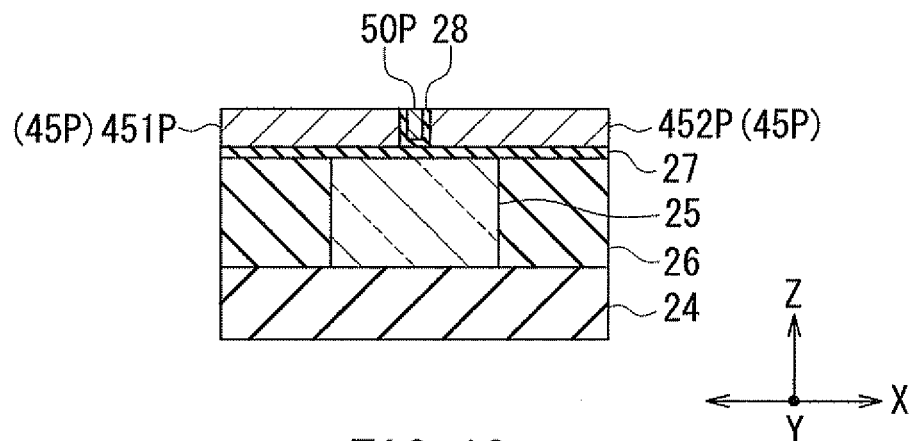
FIG. 10 is a cross-sectional view showing a step that follows the step shown in FIG. 9.

FIG. 10 shows the next step. In this step, first, the dielectric layer 29 is formed over the entire top surface of the stack. Note that the dielectric layer 29 does not appear in FIG. 10. The insulating film 28, the dielectric layer 29, and the metal film 50P are then polished by, for example, CMP, until the top surface of the first heat sink material layer 45P is exposed.

Figure 11:
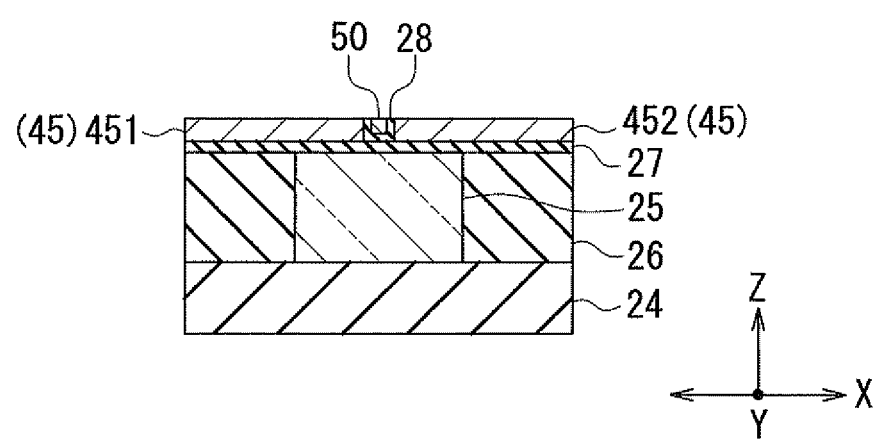
FIG. 11 is a cross-sectional view showing a step that follows the step shown in FIG. 10.

FIG. 11 shows the next step. In this step, respective portions of the insulating film 28, the dielectric layer 29, the first heat sink material layer 45P, and the metal film 50P are removed by etching so that the top surface of the polished metal film 50P has the inclined portion 51$b$1. This etching is performed in the following manner, for example. First, a photoresist mask is formed to cover at least a portion of the top surface of the polished metal film 50P, the portion being intended to later become the top surface 52$b$ of the width changing portion 52. Then, using the photoresist mask as an etching mask, the respective portions of the insulating film 28, the dielectric layer 29, the first heat sink material layer 45P, and the metal film 50P are taper-etched by, for example, ion beam etching (hereinafter referred to as IBE), in the areas not covered by the photoresist mask. The inclined portion 51$b$1 is thereby formed. The photoresist mask is then removed. This makes the metal film 50P into the plasmon generator 50. This also makes the two portions 451P and 452P of the first heat sink material layer 45P into the two portions 451 and 452, so that the first heat sink layer 45 is completed.

Figure 12:
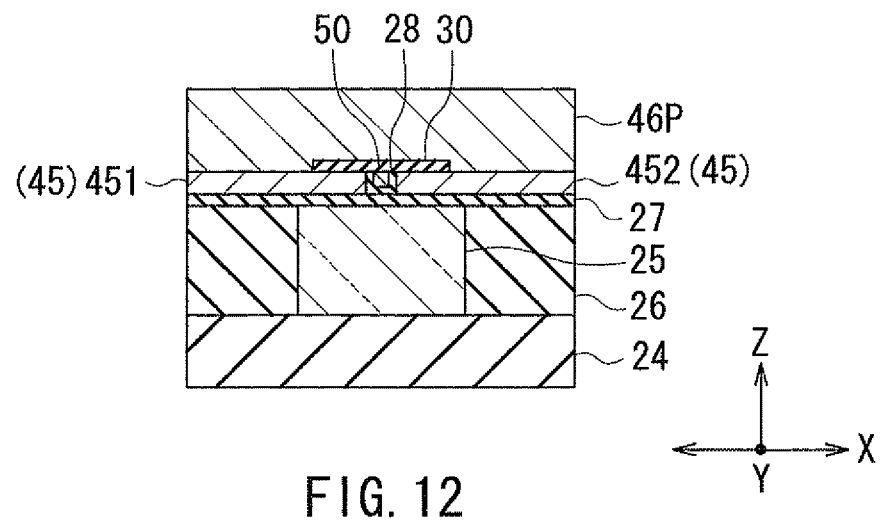
FIG. 12 is a cross-sectional view showing a step that follows the step shown in FIG. 11.

FIG. 12 shows the next step. In this step, first, the nonmagnetic layer 30 is formed to cover the plasmon generator 50. Then, a second heat sink material layer 46P, which is to become the second heat sink layer 46 later, is formed over the entire top surface of the stack.

Figure 13:
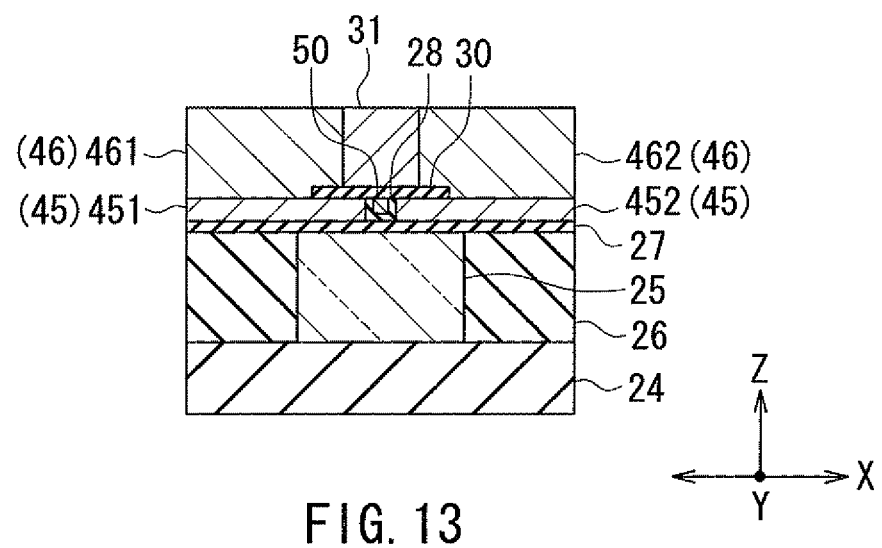
FIG. 13 is a cross-sectional view showing a step that follows the step shown in FIG. 12.

FIG. 13 shows the next step. In this step, first, a not-shown photoresist mask is formed on the second heat sink material layer 46P. The planar shape of the photoresist mask corresponds to the planar shape of the two portions 461 and 462 of the second heat sink layer 46 to be formed later. The second heat sink material layer 46P is then etched by, for example, RIE, using the photoresist mask as the etching mask. This divides the second heat sink material layer 46P into the two portions 461 and 462 to complete the second heat sink layer 46. The nonmagnetic layer 30 functions as an etching stopper for stopping the etching when the second heat sink material layer 46P is etched by RIE. Then, the photoresist mask is removed.

Next, the dielectric layer 32 is formed over the entire top surface of the stack. The dielectric layer 32 is then polished by, for example, CMP, until the top surface of the second heat sink layer 46 is exposed. Next, a not-shown photoresist mask is formed over the dielectric layer 32 and the second heat sink layer 46. The photoresist mask has an opening shaped to correspond to the planar shape of the main pole 31 to be formed later. Then, using the photoresist mask as an etching mask, a portion of the dielectric layer 32 that is exposed from the opening of the photoresist mask is taper-etched by, for example, RIE or IBE, to form in the dielectric layer 32 an accommodation part for the main pole 31 to be accommodated in. The photoresist mask is then removed. Next, the main pole 31 is formed in the accommodation part of the dielectric layer 32.

The operation and effects of the thermally-assisted magnetic recording head according to the present embodiment will now be described. The thermally-assisted magnetic recording head according to the present embodiment includes: the first heat sink layer 45 having the two portions 451 and 452 that are located on opposite sides of the plasmon generator 50 in the track width direction (the X direction); the second heat sink layer 46 having the two portions 461 and 462 that are located on opposite sides of the main pole 31 in the track width direction (the X direction); and the nonmagnetic layer 30 disposed between the plasmon generator 50 and the main pole 31.

Now, a head of a comparative example will be contemplated in which the first and second heat sink layers 45 and 46 and the nonmagnetic layer 30 are replaced with layers of alumina. In the head of the comparative example, no measures are taken to enhance the heat dissipation performance of the plasmon generator 50. Therefore, when part of the energy of the light propagating through the core 25 is transformed into heat in the plasmon generator 50, the temperature of the plasmon generator 50 rises significantly. In addition, the heat generated in the plasmon generator 50 is transferred to the main pole 31 disposed in the vicinity of the plasmon generator 50, thereby causing a rise in temperature of the main pole 31. This results in expansion of the plasmon generator 50 and the main pole 31, so that part of the medium facing surface 80 protrudes toward the recording medium. This often causes the problem that a servo signal cannot be read during write operation. The rise in temperature of each of the plasmon generator 50 and the main pole 31 may cause corrosion of the plasmon generator 50 and the main pole 31, and the rise in temperature of the main pole 31 may degrade the magnetic properties of the main pole 31 to cause deterioration of the characteristics of the write head section.

In contrast to this, in the present embodiment, the first heat sink layer 45 is provided in the vicinity of the plasmon generator 50, and the second heat sink layer 46 is provided in the vicinity of the main pole 31. The first and second heat sink layers 45 and 46 are made of SiC or AlN which has a thermal conductivity at 25° C. higher than that of alumina. According to the present embodiment, the first heat sink layer 45 enhances the heat dissipation performance of the plasmon generator 50, and the second heat sink layer 46 enhances the heat dissipation performance of the main pole 31. The present embodiment thus makes it possible to suppress a rise in temperature of each of the plasmon generator 50 and the main pole 31.

In the present embodiment, the nonmagnetic layer 30 is provided between the plasmon generator 50 and the main pole 31. The nonmagnetic layer 30 is made of a material that is lower in thermal conductivity at 25° C. than alumina. Therefore, direct heat transfer from the plasmon generator 50 to the main pole 31 can be suppressed better in the present embodiment than in the head of the comparative example. The present embodiment thus makes it possible to protect the main pole 31 from the heat generated by the plasmon generator 50.

As can be seen from the foregoing, the present embodiment is capable of preventing the occurrence of the above-described problem that may occur in the head of the comparative example.

In the present embodiment, the second heat sink layer 46 is in contact with the first heat sink layer 45. This increases the overall volume of the heat sink layer constituted of the first and second heat sink layers 45 and 46, and thereby makes it possible to enhance the heat dissipation performance of the plasmon generator 50 more effectively.

SiC, which is used as the material of the first heat sink layer 45, has conductivity. In the present embodiment, the plasmon generator 50 is electrically insulated from the first heat sink layer 45 since the insulating film 28 is provided between the plasmon generator 50 and the first heat sink layer 45. It is thereby possible to prevent the conductive first heat sink layer 45 from affecting the excitation and propagation of surface plasmons on the plasmon generator 50.

In the present embodiment, the second heat sink layer 46 is in contact with the main pole 31. This makes it possible to enhance the heat dissipation performance of the main pole 31 more effectively.

The other effects provided by the present embodiment will now be described. In the present embodiment, the plasmon generator 50 has the propagation part 51 and the width changing portion 52. The width of the bottom surface 52a of the width changing portion 52 facing the top surface 25b of the core 25 decreases with increasing proximity to the medium facing surface 80, and becomes equal to the width of the bottom surface 51a at the boundary with the bottom surface 51a. The present embodiment allows a larger area of the bottom surface of the plasmon generator 50 to be opposed to the top surface 25b of the core 25 to allow more surface plasmons to be excited than in the case where the width changing portion 52 is not provided. Consequently, according to the present embodiment, it is possible to generate near-field light of sufficient intensity.

As the plasmon generator 50 is reduced in thickness (dimension in the Z direction), the excitation efficiency of surface plasmons is decreased to cause less surface plasmons to be excited. For this reason, the thickness of the plasmon generator 50 is preferably increased to some extent. In the present embodiment, the top surface 51b of the propagation part 51 includes the inclined portion 51b1. The distance from the bottom surface 51a of the propagation part 51 to an arbitrary point on the inclined portion 51b1 decreases with decreasing distance from the arbitrary point to the front end face 51e. According to the present embodiment, it is thereby possible to reduce the dimension of the front end face 51e in the Z direction while increasing the thickness of a portion of the plasmon generator 50 that is apart from the medium facing surface 80. Consequently, according to the present embodiment, it is possible to produce near-field light having a small spot diameter and sufficient intensity.

Modification Example

Reference is now made to FIG. 14 to describe a thermally-assisted magnetic recording head of a modification example of the present embodiment. FIG. 14 is a perspective view showing the main part of the thermally-assisted magnetic recording head of the modification example of the present embodiment. In the thermally-assisted magnetic recording head of the modification example, the first heat sink layer 45 is made of AlN. AlN is an insulator. Furthermore, in the modification example, the insulating film 28 is not provided, and the first heat sink layer 45 is in contact with the plasmon generator 50. The remainder of configuration of the thermally-assisted magnetic recording head of the modification example is the same as that of the thermally-assisted magnetic recording head shown in FIG. 1 to FIG. 5. According to this modification example, since the first heat sink layer 45 is in contact with the plasmon generator 50, it is possible to enhance the heat dissipation performance of the plasmon generator 50 more effectively.

Second Embodiment

Figure 15:
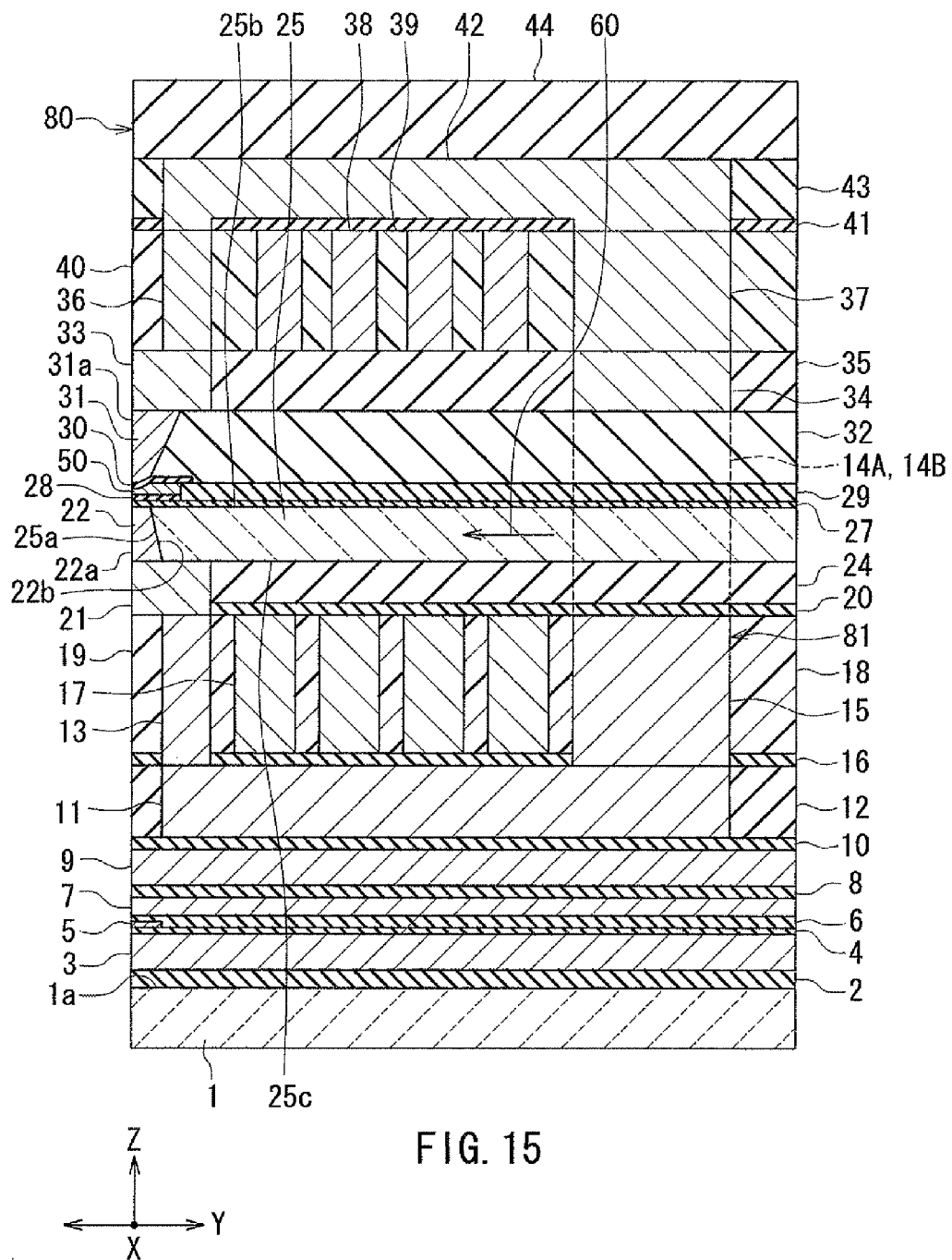
FIG. 15 is a cross-sectional view showing the configuration of a thermally-assisted magnetic recording head according to a second embodiment of the invention.
Figure 16:
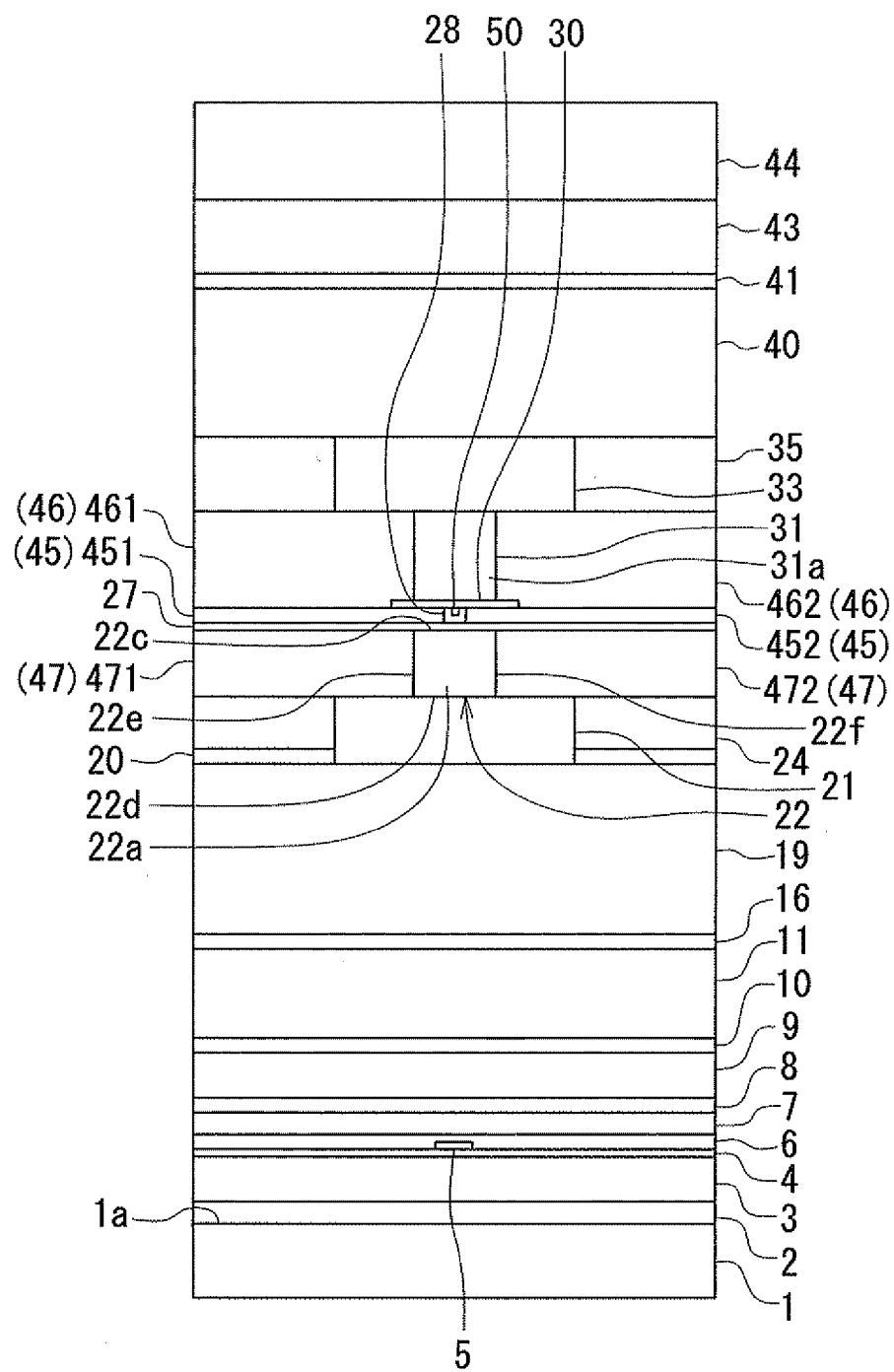
FIG. 16 is a front view showing the medium facing surface of the thermally-assisted magnetic recording head according to the second embodiment of the invention.
Figure 17:
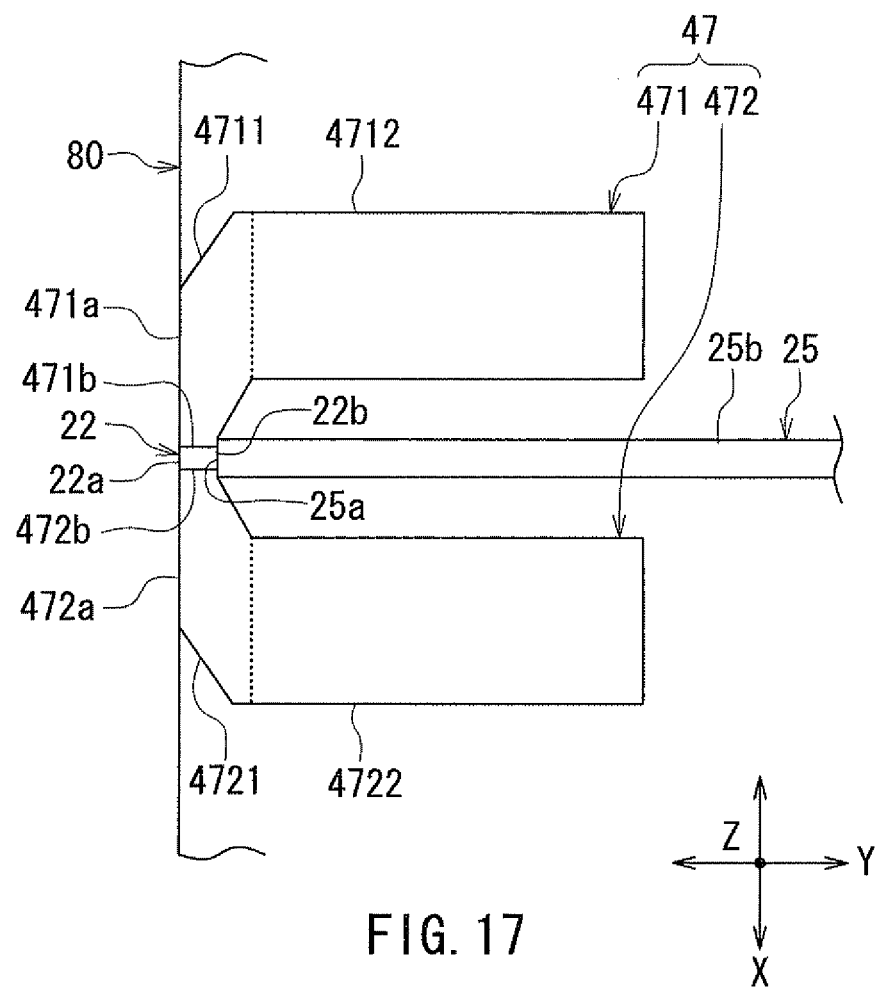
FIG. 17 is a plan view showing a third heat sink layer of the second embodiment of the invention.

A thermally-assisted magnetic recording head according to a second embodiment of the invention will now be described. First, reference is made to FIG. 15 to FIG. 17 to describe the differences of the thermally-assisted magnetic recording head according to the present embodiment from the thermally-assisted magnetic recording head according to the first embodiment. FIG. 15 is a cross-sectional view showing the configuration of the thermally-assisted magnetic recording head. FIG. 16 is a front view showing the medium facing surface of the thermally-assisted magnetic recording head. FIG. 17 is a plan view showing a third heat sink layer. The thermally-assisted magnetic recording head according to the present embodiment includes a coupling layer 15 made of a magnetic material, instead of the first layers of the coupling portions 14A and 14B of the first embodiment. In the present embodiment, the coil 17 is wound around the coupling layer 15. The second layers of the coupling portions 14A and 14B are located on the coupling layer 15. The insulating layers 16 and 18 surround the coupling layer 15.

In the present embodiment, the return pole layer 11 has an end face located at a distance from the medium facing surface 80. Part of the insulating layer 12 is interposed between the end face of the return pole layer 11 and the medium facing surface 80.

The thermally-assisted magnetic recording head according to the present embodiment further includes a coupling layer 13 made of a magnetic material and disposed on the return pole layer 11 in the vicinity of the medium facing surface 80. The coupling layer 13 has an end face facing toward the medium facing surface 80 and located at a distance from the medium facing surface 80. Portions of the insulating layers 16 and 19 are interposed between the end face of the coupling layer 13 and the medium facing surface 80.

The thermally-assisted magnetic recording head further includes a coupling layer 21 made of a magnetic material and disposed over the coupling layer 13 and the insulating layer 19. The coupling layer 21 has an end face located in the medium facing surface 80. The cladding layer 24 is disposed around the coupling layer 21.

The thermally-assisted magnetic recording head further includes a shield 22 made of a magnetic material and disposed on the coupling layer 21. The shield 22 has: a first end face 22a located in the medium facing surface 80 at a position backward of the first end face 31a of the main pole 31 in the direction of travel of the recording medium (the Z direction); a second end face 22b opposite to the first end face 22a; a top surface 22c facing toward the main pole 31; a bottom surface 22d; and two side surfaces 22e and 22f. The second end face 22b is inclined relative to the direction perpendicular to the top surface 1a of the substrate 1. The distance from the medium facing surface 80 to an arbitrary point on the second end face 22b decreases with increasing distance from the arbitrary point to the top surface 1a of the substrate 1.

In the medium facing surface 80, the near-field light generating part 51g (see FIG. 6) of the plasmon generator 50 is located between the first end face 31a of the main pole 31 and the first end face 22a of the shield 22. At least part of the plasmon generator 50 is present between the top surface 22c of the shield 22 and the main pole 31, whereas no part of the core 25 is present therebetween. In the present embodiment, the core 25 is disposed such that the shield 22 is interposed between the core 25 and the medium facing surface 80. The end face 25a of the core 25 is in contact with the second end face 22b of the shield 22.

The plasmon generator 50 is greater than the top surface 22c of the shield 22 in length in the direction perpendicular to the medium facing surface 80 (the Y direction). In the present embodiment, the plasmon exciting part of the plasmon generator 50 is composed of portions of the bottom surface 51a of the propagation part 51 and the bottom surface 52a of the width changing portion 52 that are opposed to the evanescent light generating surface (the top surface 25b) of the core 25. The plasmon exciting part and the evanescent light generating surface (the top surface 25b) of the core 25 are located farther from the medium facing surface 80 than is the top surface 22c of the shield 22.

The thermally-assisted magnetic recording head further includes a third heat sink layer 47 disposed over the coupling layer 21 and the cladding layer 24. The cladding layer 26 (see FIG. 1) is disposed around the shield 22, the core 25, and the third heat sink layer 47. The gap layer 27 is disposed over the top surface of the shield 22, the top surface of the third heat sink layer 47, the top surface 25b of the core 25, and the top surface of the cladding layer 26. The third heat sink layer 47 is made of SiC or AlN.

As shown in FIG. 16 and FIG. 17, the third heat sink layer 47 has two portions 471 and 472 that are located on opposite sides of the shield 22 in the track width direction (the X direction). The portion 471 has a front end face 471a located in the medium facing surface 80, a side end face 471b in contact with the shield 22, a top surface, and a bottom surface. The portion 472 has a front end face 472a located in the medium facing surface 80, a side end face 472b in contact with the shield 22, a top surface, and a bottom surface.

The portion 471 includes a front section 4711 and a rear section 4712. The rear section 4712 is located farther from the medium facing surface 80 than is the front section 4711. The front section 4711 includes the front end face 471a and the side end face 471b, and has a rear end opposite to the front end face 471a. The rear section 4712 is connected to the rear end of the front section 4711 and extends in the direction perpendicular to the medium facing surface 80 (the Y direction). Likewise, the portion 472 includes a front section 4721 and a rear section 4722. The rear section 4722 is located farther from the medium facing surface 80 than is the front section 4721. The front section 4721 includes the front end face 472a and the side end face 472b, and has a rear end opposite to the front end face 472a. The rear section 4722 is connected to the rear end of the front section 4721 and extends in the direction perpendicular to the medium facing surface 80 (the Y direction). In FIG. 17, the boundary between the front section 4711 and the rear section 4712 and the boundary between the front section 4721 and the rear section 4722 are shown by dotted lines. As viewed from above, the rear section 4712 and the rear section 4722 are located on opposite sides of the core 25 in the track width direction and are sufficiently apart from the core 25.

The side surface 22e of the shield 22 is in contact with the side end face 471b of the portion 471 of the third heat sink layer 47. The side surface 22f of the shield 22 is in contact with the side end face 472b of the portion 472 of the third heat sink layer 47.

The thermally-assisted magnetic recording head further includes: a coupling layer 33 made of a magnetic material and disposed on the main pole 31; a coupling layer 34 made of a magnetic material and disposed over the fourth layers of the coupling portions 14A and 14B and the dielectric layer 32; and a dielectric layer 35 disposed around the coupling layers 33 and 34. The dielectric layer 35 is made of $SiO_2$, for example. The coupling layer 33 has an end face located in the medium facing surface 80.

The thermally-assisted magnetic recording head further includes a coupling layer 36 made of a magnetic material and disposed on the coupling layer 33, and a coupling layer 37 made of a magnetic material and disposed on the coupling layer 34. In the present embodiment, the coil 38 is disposed on the dielectric layer 35 and wound around the coupling layer 37. The insulating layer 39 is disposed around the coil 38 and the coupling layers 36 and 37 and in the space between every adjacent turns of the coil 38.

The thermally-assisted magnetic recording head further includes an insulating layer 40 disposed around the coupling layer 36 and the insulating layer 39, and an insulating layer 41 disposed over the coil 38 and the insulating layers 39 and 40. In the present embodiment, the yoke layer 42 is disposed over the coupling layers 36 and 37 and the insulating layer 41. The yoke layer 42 magnetically couples the coupling layer 36 and the coupling layer 37 to each other. The thermally-assisted magnetic recording head further includes an insulating layer 43 disposed around the yoke layer 42. The insulating layers 40, 41, and 43 are made of alumina, for example. In the present embodiment, the protective layer 44 is disposed to cover the yoke layer 42 and the insulating layer 43.

The coupling layers 21 and 13, the return pole layer 11, the coupling layer 15, the coupling portions 14A and 14B, the coupling layers 34 and 37, the yoke layer 42, and the coupling layers 36 and 33 constitute a return path section 81. The return path section 81 allows magnetic fluxes corresponding to the magnetic fields produced by the coils 17 and 38 to pass. The return path section 81 connects the main pole 31 and the shield 22 to each other so that a space is defined by the main pole 31, the shield 22 and the return path section 81 to allow portions of the coils 17 and 38 to pass through the space. The coupling layers 13 and 21 magnetically couple the shield 22 and the return pole layer 11 to each other.

The function of the shield 22 and the effects provided by the present embodiment will now be described. The shield 22 captures a disturbance magnetic field applied to the thermally-assisted magnetic recording head from the outside thereof. This makes it possible to prevent erroneous writing on the recording medium induced by the disturbance magnetic field intensively captured into the main pole 31. The shield 22 also functions to capture a magnetic flux that is produced from the end face 31a of the main pole 31 and spreads in directions other than the direction perpendicular to the plane of the recording medium, and to thereby prevent the magnetic flux from reaching the recording medium. It is thereby possible to increase the gradient of the change in write magnetic field intensity with respect to the change in position along the direction in which the tracks extend, i.e., the direction along the tracks (this gradient will hereinafter be referred to as the gradient of the write field intensity). Furthermore, the shield 22 and the return path section 81 function to allow a magnetic flux that has been produced from the end face 31a of the main pole 31 and has magnetized the recording medium to flow back to the main pole 31.

In the present embodiment, the near-field light generating part 51g is located in the medium facing surface 80 so as to be interposed between the end face 31a of the main pole 31 and the end face 22a of the shield 22. This makes it possible to produce a write magnetic field of a high write field intensity in the vicinity of the near-field light generating part 51g. Consequently, according to the present embodiment, it is possible to increase the linear recording density.

In the present embodiment, the shield 22 is disposed in the vicinity of the plasmon generator 50, as is the main pole 31. Therefore, if no measures are taken to enhance the heat dissipation performance of the shield 22, the shield 22 will increase in temperature and suffer from the same problem as the problem with the main pole 31 of the head of the comparative example that has been described in relation to the first embodiment. In the present embodiment, however, the third heat sink layer 47 is provided in the vicinity of the shield 22. The third heat sink layer 47 is made of SiC or AlN. According to the present embodiment, it is therefore possible to enhance the heat dissipation performance of the shield 22 to suppress a rise in temperature of the shield 22.

In the present embodiment, the third heat sink layer 47 is in contact with the shield 22. This allows the heat dissipation performance of the shield 22 to be enhanced more effectively.

A method of manufacturing the thermally-assisted magnetic recording head according to the present embodiment will now be described with reference to FIG. 18A to FIG. 22B. FIG. 18A to FIG. 22B are cross-sectional views each showing part of a stack of layers formed in the process of manufacturing the thermally-assisted magnetic recording head. FIG. 18A to FIG. 22A each show a cross section that intersects the end face 31a of the main pole 31 and is perpendicular to the medium facing surface 80 and the top surface 1a of the substrate 1. FIG. 18B to FIG. 22B each show a cross section of the stack taken in the position where the medium facing surface 80 is to be formed.

Figure 18A:
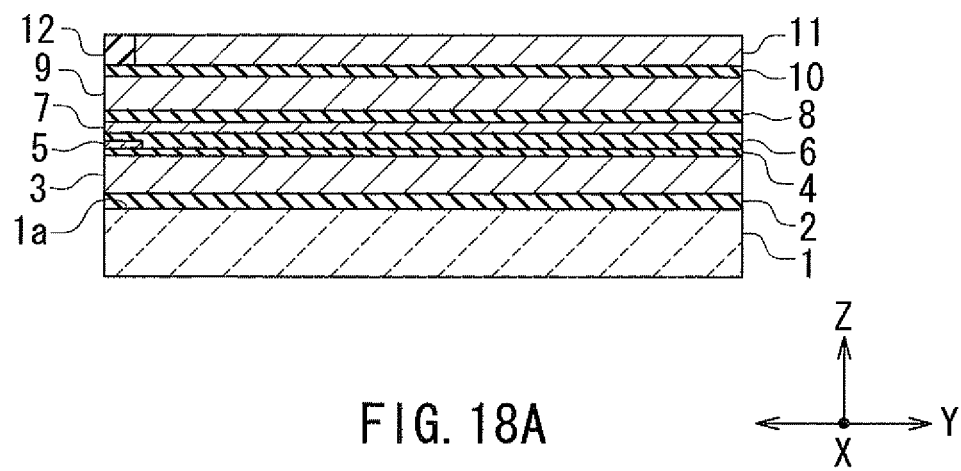
FIG. 18A and FIG. 18B are cross-sectional views showing a step of a method of manufacturing the thermally-assisted magnetic recording head according to the second embodiment of the invention.
Figure 18A:
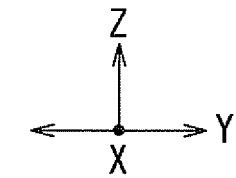
Figure 18B:
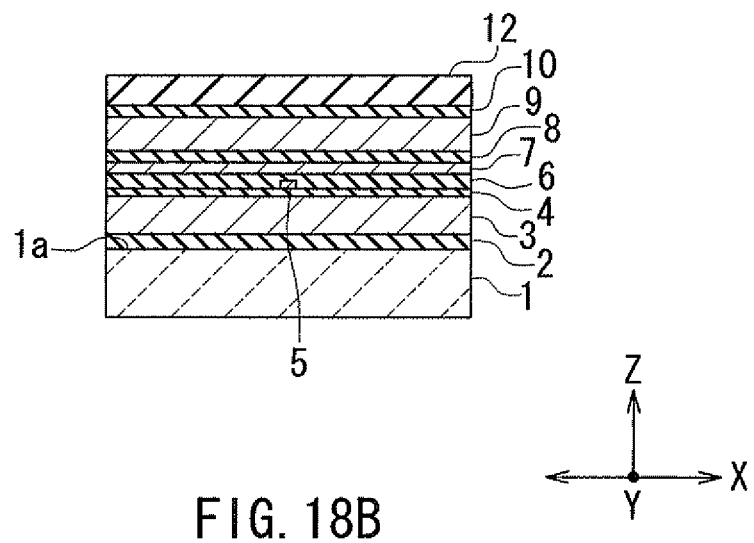
Figure 18B:
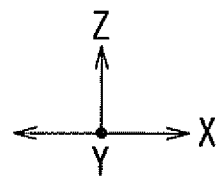

The method of manufacturing the thermally-assisted magnetic recording head according to the present embodiment is the same as that of first embodiment up to the step of polishing the insulating layer 12. FIG. 18A and FIG. 18B show the stack having undergone the polishing of the insulating layer 12.

Figure 19A:
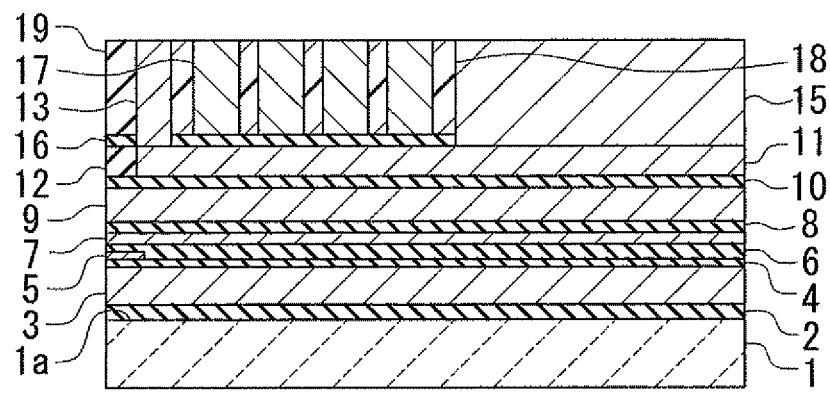
FIG. 19A and FIG. 19B are cross-sectional views showing a step that follows the step shown in FIG. 18A and FIG. 18B.
Figure 19A:
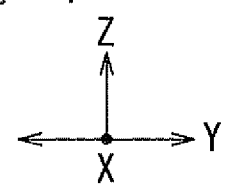
Figure 19B:
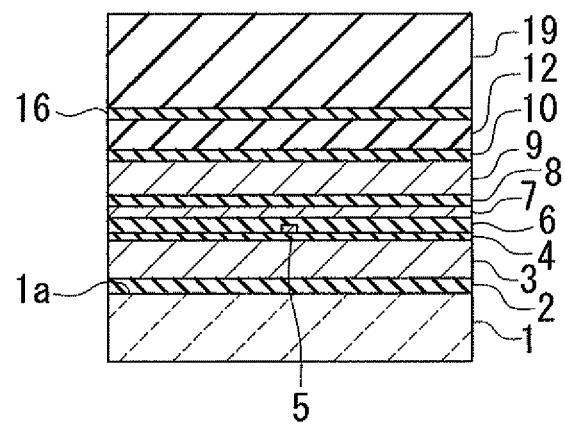
Figure 19B:
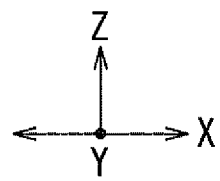

FIG. 19A and FIG. 19B show the next step. In this step, first, the insulating layer 16 is formed over the return pole layer 11 and the insulating layer 12. The insulating layer 16 is then selectively etched to form therein two openings for exposing the top surface of the return pole layer 11. In the positions of these two openings, the coupling layers 13 and 15 are then formed on the return pole layer 11. Next, the coil 17 is formed on the insulating layer 16. The insulating layer 18 is then formed around the coil 17 and the coupling layers 13 and 15 and in the space between every adjacent turns of the coil 17. Next, the insulating layer 19 is formed over the entire top surface of the stack. The insulating layer 19 is then polished by, for example, CMP, until the coupling layers 13 and 15, the coil 17, and the insulating layer 18 are exposed.

Figure 20A:
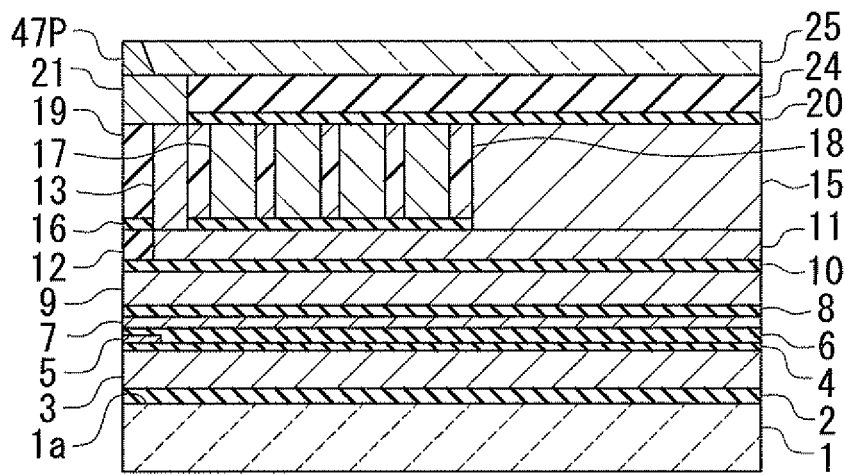
FIG. 20A and FIG. 20B are cross-sectional views showing a step that follows the step shown in FIG. 19A and FIG. 19B.
Figure 20B:
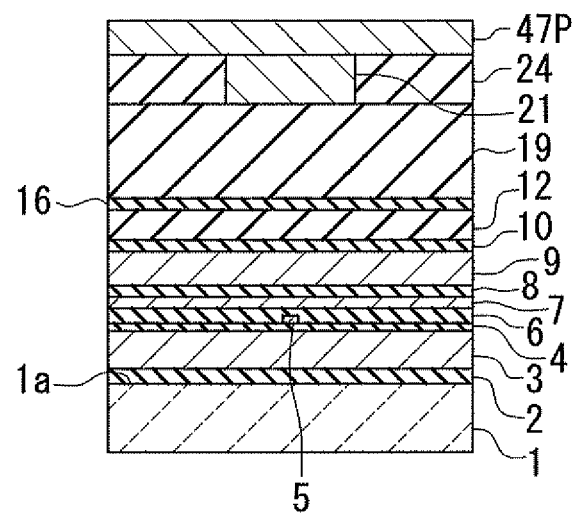

FIG. 20A and FIG. 20B show the next step. In this step, first, the insulating layer 20 is formed over the entire top surface of the stack. The insulating layer 20 is then selectively etched to form therein an opening for exposing the top surface of the coupling layer 13 and two openings for exposing the top surface of the coupling layer 15. Then, the coupling layer 21 is formed over the coupling layer 13 and the insulating layer 19, and the second layers of the coupling portions 14A and 14B are formed on the coupling layer 15. Next, the cladding layer 24 is formed over the entire top surface of the stack. The cladding layer 24 is then polished by, for example, CMP, until the second layers of the coupling portions 14A and 14B and the coupling layer 21 are exposed.

A third heat sink material layer 47P, which is to become the third heat sink layer 47 later, is then formed over the entire top surface of the stack. Next, a not-shown photoresist mask is formed on the third heat sink material layer 47P. The photoresist mask has an opening shaped to correspond to the planar shape of the core 25. The third heat sink material layer 47P is then etched by, for example, RIE, to form therein an accommodation part for the core 25 to be accommodated in. The photoresist mask is then removed. Next, the core 25 is formed in the accommodation part of the third heat sink material layer 47P.

Figure 21A:
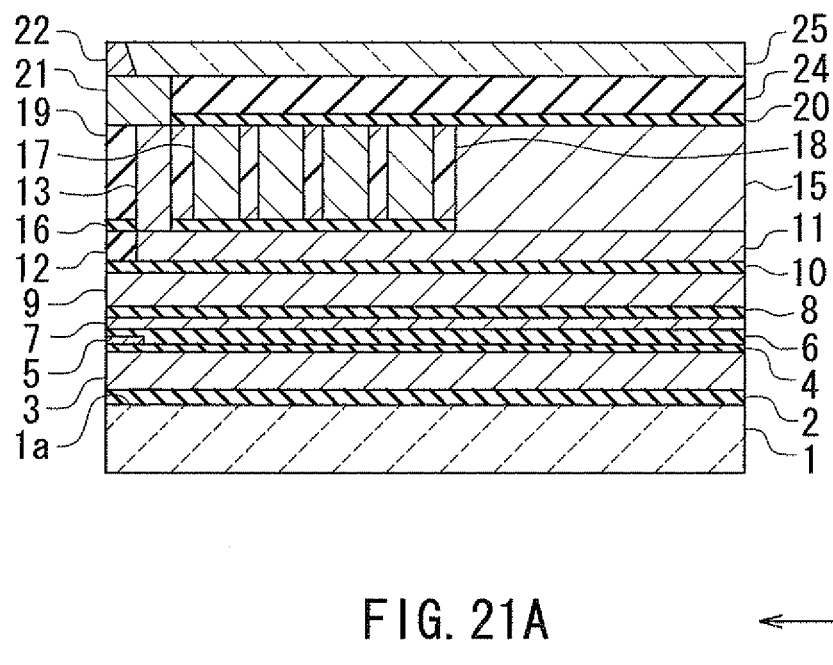
FIG. 21A and FIG. 21B are cross-sectional views showing a step that follows the step shown in FIG. 20A and FIG. 20B.
Figure 21B:
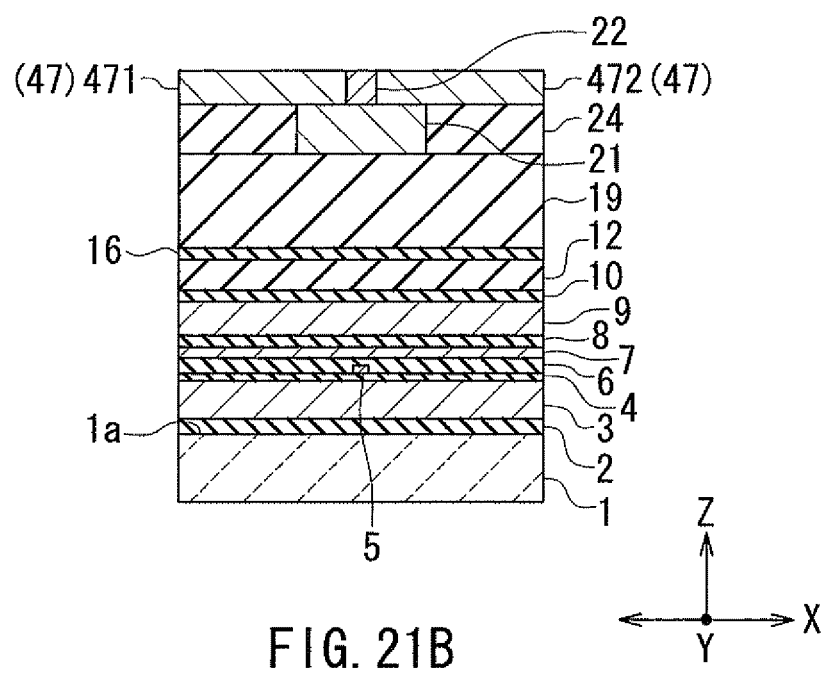

FIG. 21A and FIG. 21B show the next step. In this step, first, a not-shown photoresist mask whose planar shape corresponds to the planar shape of the two portions 471 and 472 of the third heat sink layer 47 to be formed later is formed on the third heat sink material layer 47P, and another not-shown photoresist mask is formed on the core 25. Using these photoresist masks as etching masks, the third heat sink material layer 47P is etched by RIE, for example. This divides the third heat sink material layer 47P into the two portions 471 and 472 to complete the third heat sink layer 47.

Next, the third layers of the coupling portions 14A and 14B are formed on the second layers of the coupling portions 14A and 14B, and the shield 22 is formed on the coupling layer 21. Then, the cladding layer 26 is formed over the entire top surface of the stack. The cladding layer 26 is then polished by, for example, CMP, until the third layers of the coupling portions 14A and 14B, the shield 22, the core 25, and the third heat sink layer 47 are exposed.

Figure 22A:
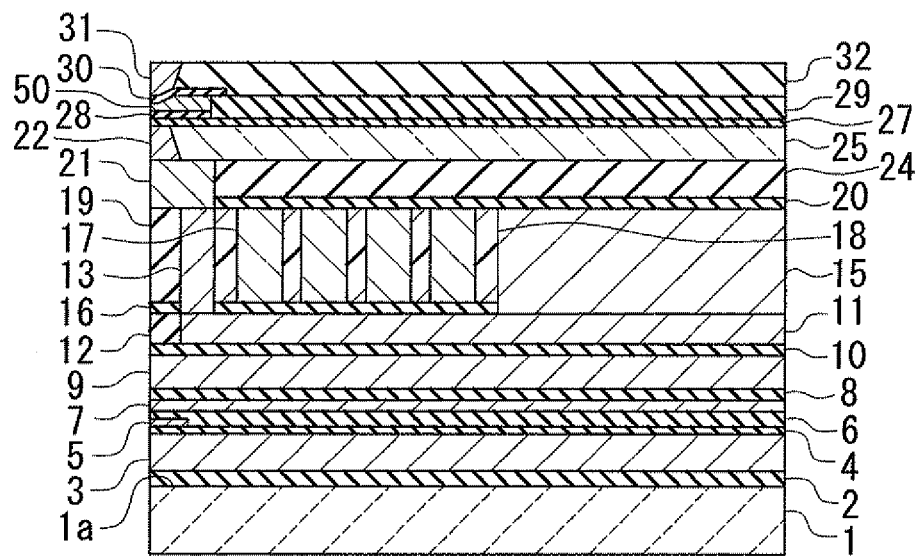
FIG. 22A and FIG. 22B are cross-sectional views showing a step that follows the step shown in FIG. 21A and FIG. 21B.
Figure 22B:
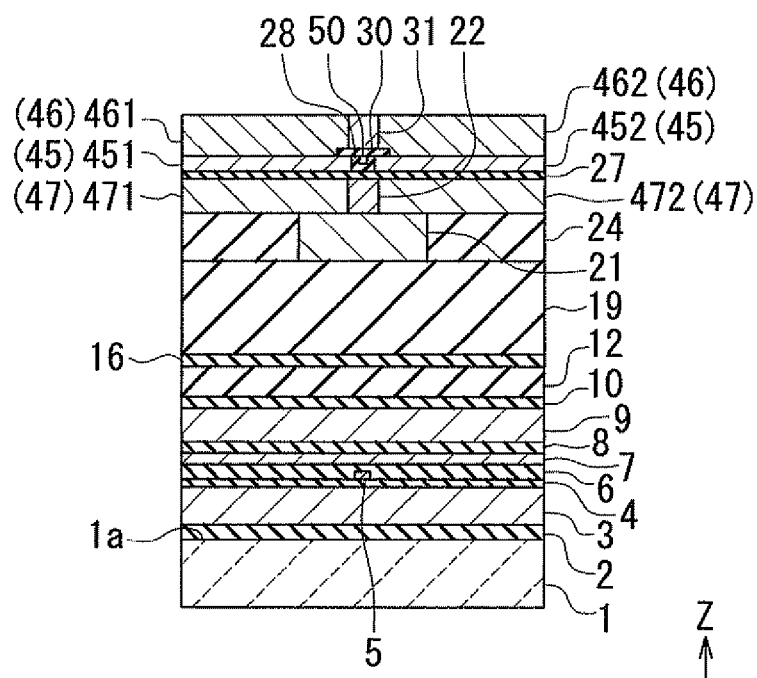

FIG. 22A and FIG. 22B show the next step. In this step, first, the gap layer 27 is formed over the entire top surface of the stack. The insulating film 28, the dielectric layers 29 and 32, the nonmagnetic layer 30, the main pole 31, the first heat sink layer 45, the second heat sink layer 46, and the plasmon generator 50 are then formed in the same manner as the process that has been described with reference to FIG. 7 to FIG. 13 in relation to the first embodiment. Next, the gap layer 27 and the dielectric layers 29 and 32 are selectively etched to form therein two openings for exposing the top surfaces of the third layers of the coupling portions 14A and 14B. The fourth layers of the coupling portions 14A and 14B are then formed on the third layers of the coupling portions 14A and 14B.

The steps to follow the step shown in FIG. 22A and FIG. 22B will now be described with reference to FIG. 15 and FIG. 16. First, the coupling layer 33 is formed over the main pole 31 and the dielectric layer 32, and the coupling layer 34 is formed over the fourth layers of the coupling portions 14A and 14B and the dielectric layer 32. Next, the dielectric layer 35 is formed over the entire top surface of the stack. The dielectric layer 35 is then polished by, for example, CMP, until the coupling layers 33 and 34 are exposed.

Next, the coupling layer 36 is formed on the coupling layer 33, and the coupling layer 37 is formed on the coupling layer 34. The coil 38 is then formed on the dielectric layer 35. Then, the insulating layer 39 is formed around the coil 38 and the coupling layers 36 and 37 and in the space between every adjacent turns of the coil 38. Next, the insulating layer 40 is formed over the entire top surface of the stack. The insulating layer 40 is then polished by, for example, CMP, until the coupling layers 36 and 37, the coil 38, and the insulating layer 39 are exposed.

Next, the insulating layer 41 is formed over the entire top surface of the stack. The insulating layer 41 is then selectively etched to form therein an opening for exposing the top surface of the coupling layer 36 and an opening for exposing the top surface of the coupling layer 37. Next, the yoke layer 42 is formed over the coupling layers 36 and 37 and the insulating layer 41. Then, the insulating layer 43 is formed over the entire top surface of the stack. The insulating layer 43 is then polished by, for example, CMP, until the yoke layer 42 is exposed. The protective layer 44 is then formed to cover the yoke layer 42 and the insulating layer 43. The subsequent steps are the same as in the first embodiment.

In the present embodiment, as in the modification example of the first embodiment, the first heat sink layer 45 may be made of AlN. In this case, the insulating film 28 may be omitted and the first heat sink layer 45 may be in contact with the plasmon generator 50. The remainder of configuration, function and effects of the present embodiment are similar to those of the first embodiment.

Third Embodiment

Figure 23:
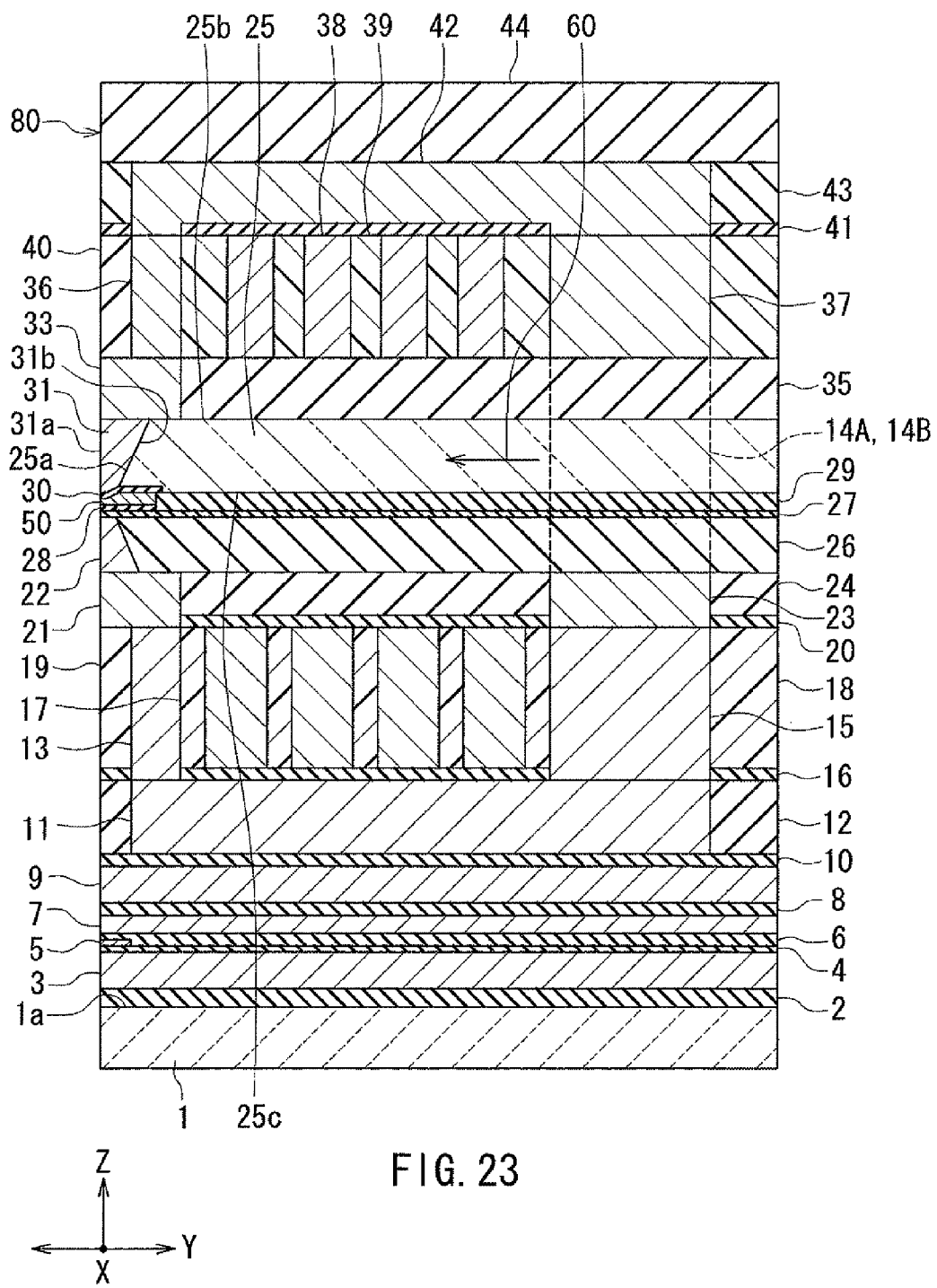
FIG. 23 is a cross-sectional view showing the configuration of a thermally-assisted magnetic recording head according to a third embodiment of the invention.

A thermally-assisted magnetic recording head according to a third embodiment of the invention will now be described. First, reference is made to FIG. 23 to describe the differences of the thermally-assisted magnetic recording head according to the present embodiment from the thermally-assisted magnetic recording head according to the second embodiment. FIG. 23 is a cross-sectional view showing the configuration of the thermally-assisted magnetic recording head. In the thermally-assisted magnetic recording head according to the present embodiment, the core 25 is located at a different position from that in the second embodiment. In the present embodiment, the core 25 is located at such a position that the main pole 31 is interposed between the core 25 and the medium facing surface 80. More specifically, the core 25 is located on the dielectric layer 29 and the nonmagnetic layer 30. The end face 25a of the core 25 is in contact with the second end face 31b of the main pole 31.

Part of the nonmagnetic layer 30 is interposed between the bottom surface 25c of the core 25 and the top surface of the plasmon generator 50. The rear section 4612 of the portion 461 and the rear section 4622 of the portion 462 of the second heat sink layer 46 are located on opposite sides of the core 25 in the track width direction (the X direction) and are spaced from the core 25. The dielectric layer 32 (see FIG. 15) is disposed around the core 25, the main pole 31, and the second heat sink layer 46. The dielectric layer 35 is disposed over the core 25, the dielectric layer 32, and the second heat sink layer 46.

The thermally-assisted magnetic recording head according to the present embodiment includes a coupling layer 23 instead of the second layers of the coupling portions 14A and 14B. The coupling layer 23 is located on the coupling layer 15. The third layers of the coupling portions 14A and 14B are located on the coupling layer 23. The insulating layer 20 and the cladding layer 24 surround the coupling layer 23.

The thermally-assisted magnetic recording head according to the present embodiment does not have the coupling layer 34. Instead, the coupling portions 14A and 14B have their respective fifth layers on their respective fourth layers. The fifth layers of the coupling portions 14A and 14B are embedded in the dielectric layer 35. The coupling layer 37 is disposed over the fifth layers of the coupling portions 14A and 14B and the dielectric layer 35. In the present embodiment, the return path section 81 is constituted of the coupling layers 21 and 13, the return pole layer 11, the coupling layers 15 and 23, the coupling portions 14A and 14B, the coupling layer 37, the yoke layer 42, and the coupling layers 36 and 33.

In the present embodiment, the dielectric layers 29, 32, and 35, and the nonmagnetic layer 30 function as the cladding of the waveguide. The dielectric layers 29, 32, and 35 of the present embodiment are each made of a dielectric material that has a refractive index lower than that of the core 25. For example, the dielectric layers 29, 32, and 35 can be made of $SiO_2$ or alumina. The nonmagnetic layer 30 of the present embodiment is made of a dielectric material that has a refractive index lower than that of the core 25 and has a lower thermal conductivity at 25° C. than that of alumina. An example of the material of the nonmagnetic layer 30 is $SiO_2$.

The principle of generation of near-field light in the present embodiment will now be described. In the present embodiment, the bottom surface 25c of the core 25 corresponds to the evanescent light generating surface according to the invention. The plasmon exciting part of the plasmon generator 50 is composed of portions of the top surface 51b of the propagation part 51 and the top surface 52b of the width changing portion 52 that are opposed to the evanescent light generating surface (the bottom surface 25c) of the core 25. As has been described in relation to the first embodiment, laser light emitted from a not-shown laser diode enters the core 25. As shown in FIG. 23, the laser light 60 propagates through the core 25 toward the medium facing surface 80, and reaches the vicinity of the plasmon generator 50. Here, the laser light 60 is totally reflected at the evanescent light generating surface (the bottom surface 25c) of the core 25 to generate evanescent light permeating into the nonmagnetic layer 30. Surface plasmons are then excited on the plasmon exciting part of the plasmon generator 50 through coupling with the evanescent light.

The remainder of configuration, function and effects of the present embodiment are similar to those of the second embodiment.

Fourth Embodiment

Figure 24:
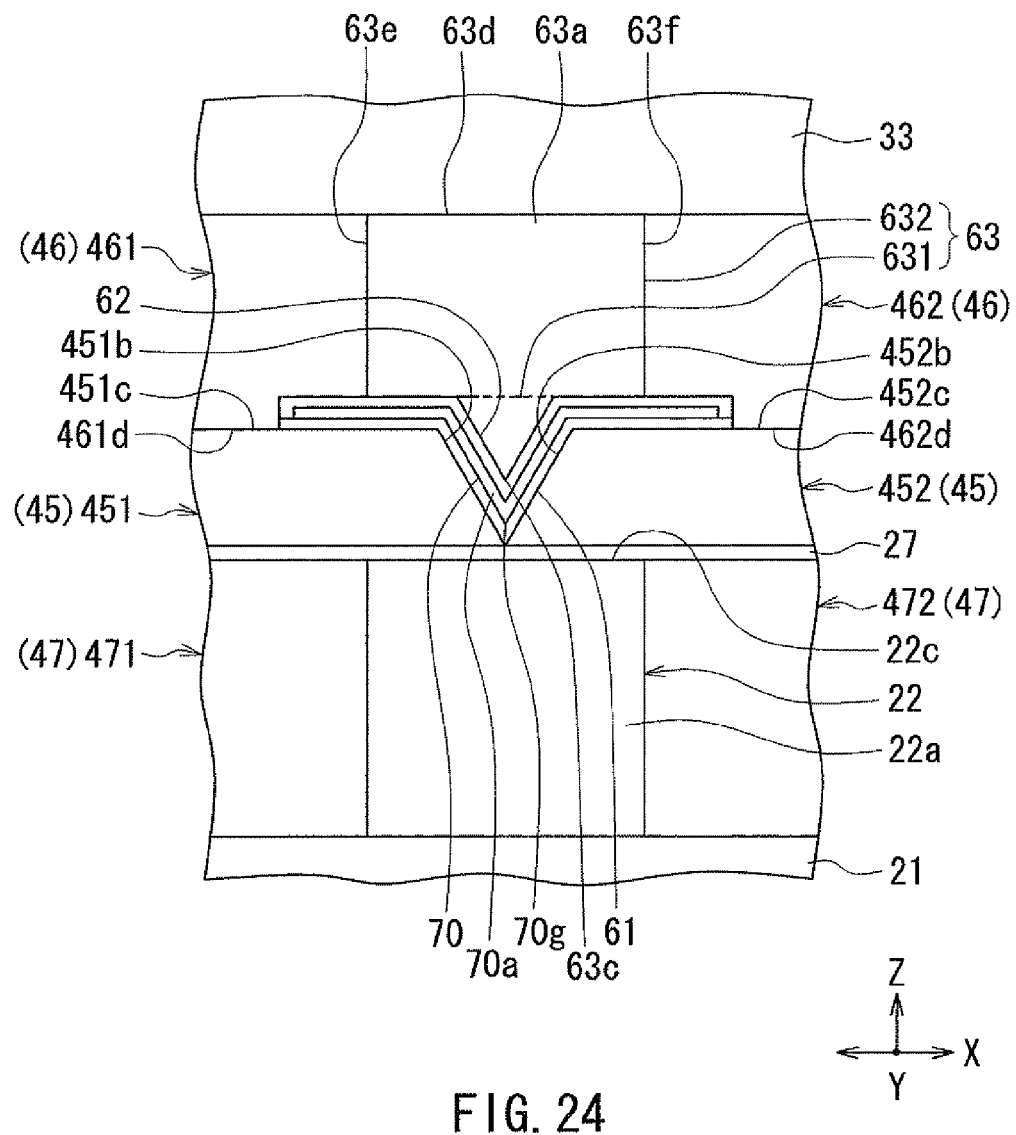
FIG. 24 is a front view showing the main part of a thermally-assisted magnetic recording head according to a fourth embodiment of the invention.
Figure 25:
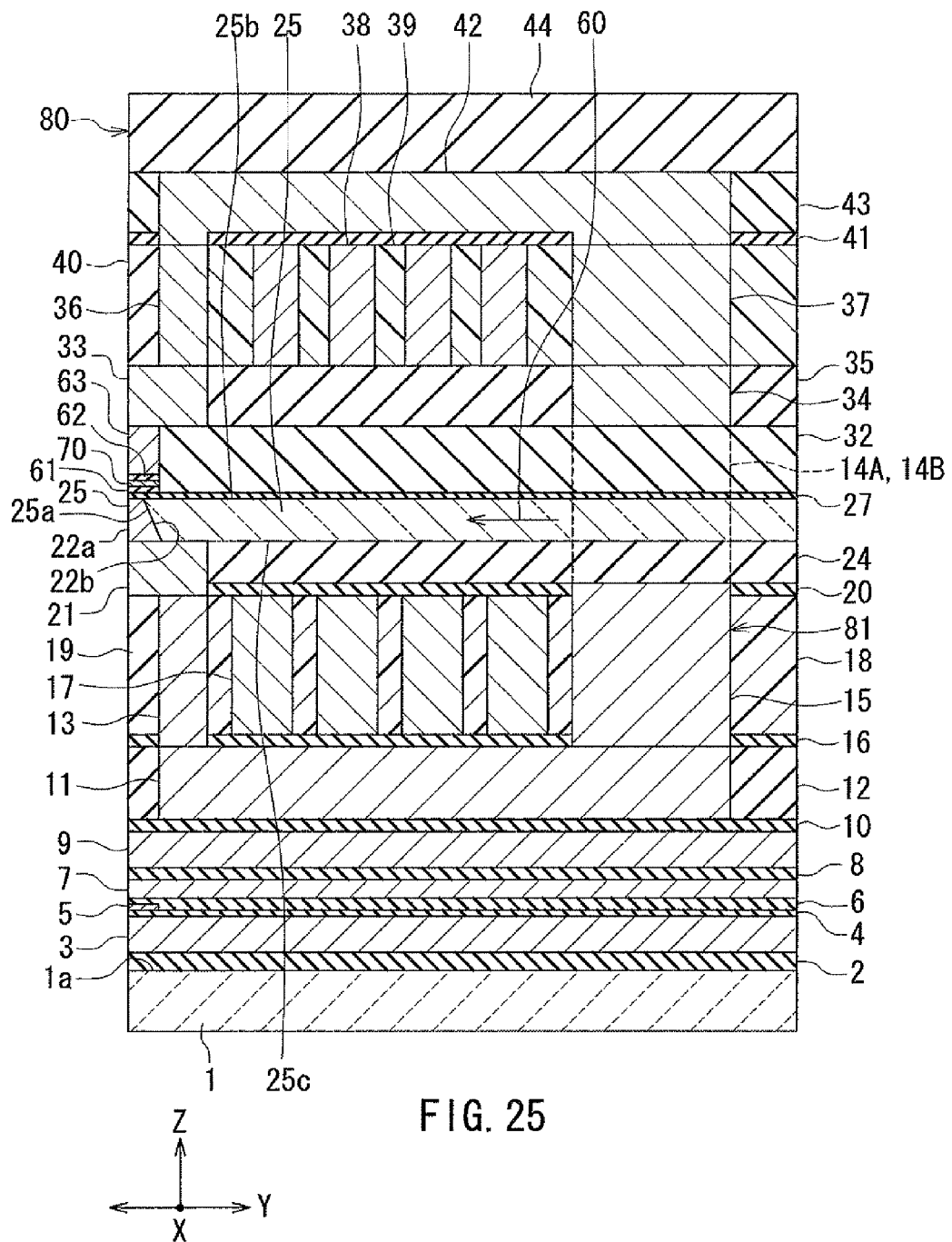
FIG. 25 is a cross-sectional view showing the configuration of the thermally-assisted magnetic recording head according to the fourth embodiment of the invention.
Figure 26:
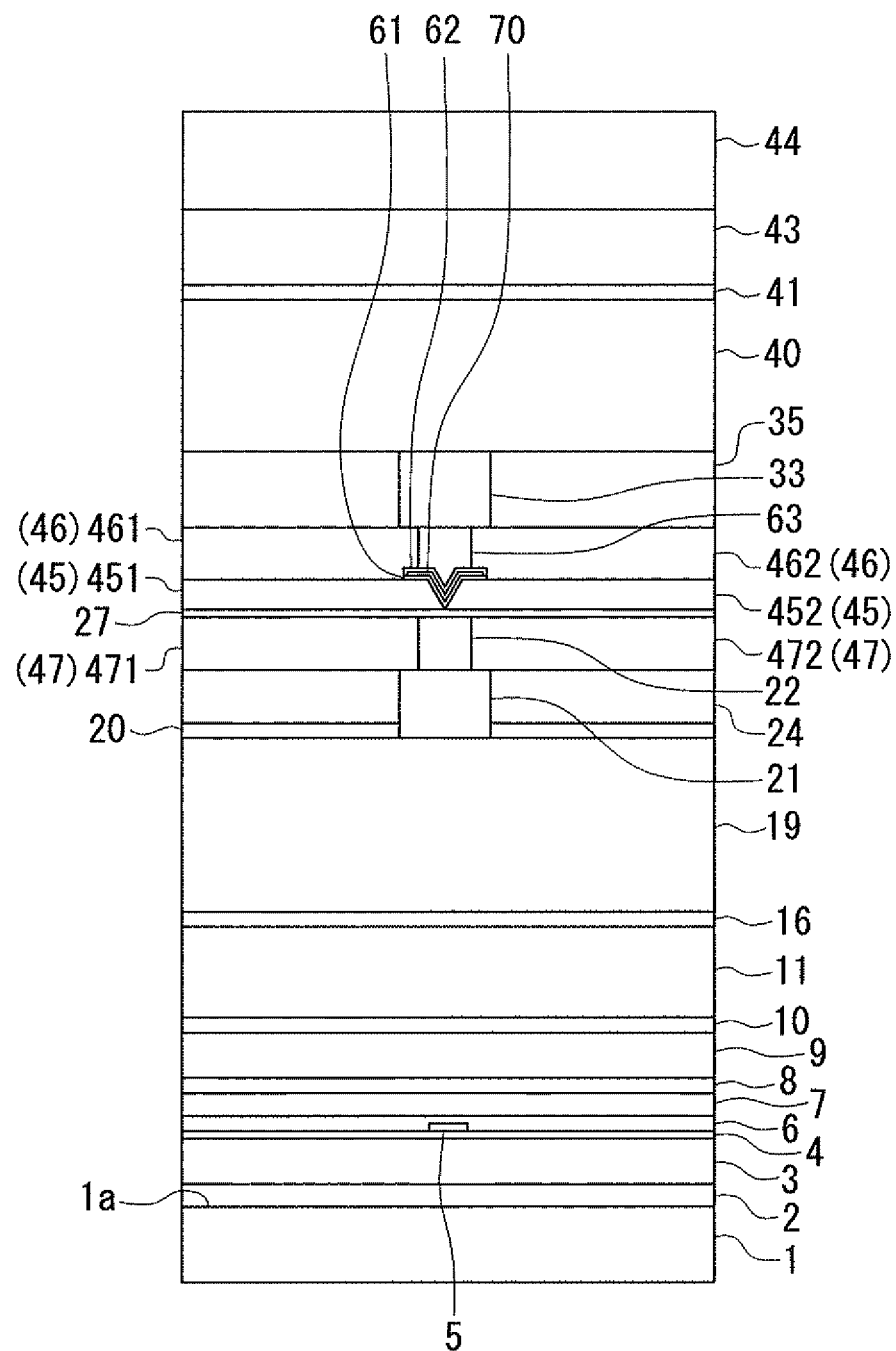
FIG. 26 is a front view showing the medium facing surface of the thermally-assisted magnetic recording head according to the fourth embodiment of the invention.
Figure 27:
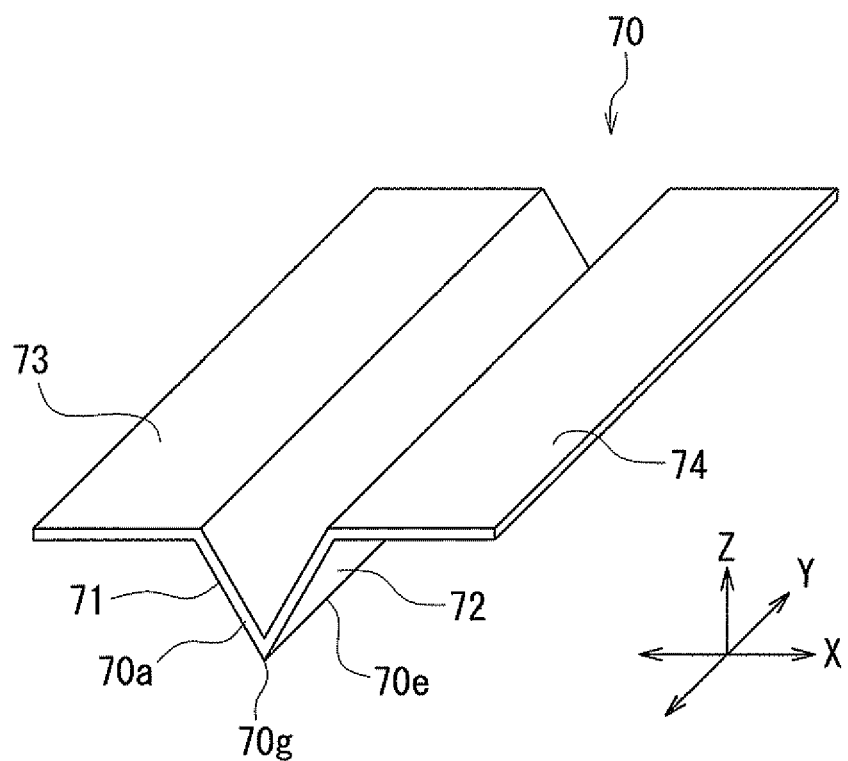
FIG. 27 is a perspective view showing a plasmon generator of the fourth embodiment of the invention.

A thermally-assisted magnetic recording head according to a fourth embodiment of the invention will now be described. First, reference is made to FIG. 24 to FIG. 27 to describe the differences of the thermally-assisted magnetic recording head according to the present embodiment from the thermally-assisted magnetic recording head according to the second embodiment. FIG. 24 is a front view showing the main part of the thermally-assisted magnetic recording head. FIG. 25 is a cross-sectional view showing the configuration of the thermally-assisted magnetic recording head. FIG. 26 is a front view showing the medium facing surface of the thermally-assisted magnetic recording head. FIG. 27 is a perspective view showing the plasmon generator. In the thermally-assisted magnetic recording head according to the present embodiment, the side end face 451b of the portion 451 and the side end face 452b of the portion 452 of the first heat sink layer 45 are each inclined relative to the direction perpendicular to the top surface 1a of the substrate 1 such that the distance between the side end faces 451b and 452b increases with increasing distance from the top surface 1a of the substrate 1. The first heat sink layer 45 has a groove defined by the side end faces 451b and 452b. The groove extends in the direction perpendicular to the medium facing surface 80. The groove is V-shaped in cross section parallel to the medium facing surface 80.

The thermally-assisted magnetic recording head according to the present embodiment has an insulating film 61, a nonmagnetic layer 62, a main pole 63, and a plasmon generator 70, instead of the insulating film 28, the nonmagnetic layer 30, the main pole 31, and the plasmon generator 50 of the second embodiment, respectively. The insulating film 61, the nonmagnetic layer 62, the main pole 63, and the plasmon generator 70 may be made of materials the same as those of the insulating film 28, the nonmagnetic layer 30, the main pole 31, and the plasmon generator 50, respectively. The insulating film 61 is disposed along the side end face 451b and the top surface 451c of the portion 451, and the side end face 452b and the top surface 452c of the portion 452 of the first heat sink layer 45.

The plasmon generator 70 is disposed on the insulating film 61, and has the same shape as that of the insulating film 61. The plasmon generator 70 has a sidewall part 71, a sidewall part 72, and extended portions 73 and 74. The sidewall parts 71 and 72 and the extended portions 73 and 74 are each plate-shaped. The sidewall part 71 has a first slope that is opposed to the side end face 451b with the insulating film 61 therebetween. The sidewall part 72 has a second slope that is opposed to the side end face 452b with the insulating film 61 therebetween. The extended portion 73 extends from the top end of the sidewall part 71 in a direction away from both the sidewall parts 71 and 72, and is disposed on the top surface 451c with the insulating film 61 therebetween. The extended portion 74 extends from the top end of the sidewall part 72 in a direction away from both the sidewall parts 71 and 72, and is disposed on the top surface 452c with the insulating film 61 therebetween. Note that the plasmon generator 70 may be without the extended portions 73 and 74.

The plasmon generator 70 further has a front end face 70a located in the medium facing surface 80. The front end face 70a includes a near-field light generating part 70g that generates near-field light based on surface plasmons. The plasmon generator 70 further has an edge part 70e defined by the first and second slopes intersecting each other. The edge part 70e is at a predetermined distance from the top surface 25b of the core 25 and extends in the direction perpendicular to the medium facing surface 80 (the Y direction). The angle between the first slope and the second slope is equal to the angle between the side end faces 451b and 452b. The near-field light generating part 70g lies at an end of the edge part 70e.

The nonmagnetic layer 62 has the same shape as the plasmon generator 70, and is disposed to extend along the plasmon generator 70 such that the plasmon generator 70 is interposed between the nonmagnetic layer 62 and the insulating film 61.

The main pole 63 has an end face 63a located in the medium facing surface 80, a bottom end 63c, a top surface 63d, and two side surfaces 63e and 63f. The side surface 63e is in contact with the side end face 461b of the portion 461 of the second heat sink layer 46. The side surface 63f is in contact with the side end face 462b of the portion 462 of the second heat sink layer 46.

The main pole 63 includes a first portion 631 accommodated in the space defined by part of the nonmagnetic layer 62 extending along the sidewall parts 71 and 72 of the plasmon generator 70, and a second portion 632 that is located farther from the core 25 than is the first portion 631. In FIG. 24, the boundary between the first portion 631 and the second portion 632 is shown by chain double-dashed lines.

The shapes and the arrangement of the plasmon generator 70 and the main pole 63 are not limited to the foregoing example that has been described with reference to FIG. 24 to FIG. 27. For example, the plasmon generator 70 may include a flat part instead of the edge part 70e. The flat part may include a width changing portion. In the width changing portion, the width in the direction parallel to the medium facing surface 80 and the top surface 1*a* of the substrate 1 (the X direction) decreases with increasing proximity to the medium facing surface 80. Alternatively, the plasmon generator 70 may include an edge part, and a flat part that is connected to the edge part and is located farther from the medium facing surface 80 than is the edge part.

The principle of generation of near-field light in the present embodiment will now be described. As has been described in relation to the first embodiment, laser light emitted from a not-shown laser diode enters the core 25. As shown in FIG. 25, the laser light 60 propagates through the core 25 toward the medium facing surface 80, and reaches the vicinity of the plasmon generator 70. Here, the laser light 60 is totally reflected at the evanescent light generating surface (the top surface 25*b*) of the core 25 to generate evanescent light permeating into the gap layer 27. The plasmon generator 70 has a plasmon exciting part that faces the evanescent light generating surface (the top surface 25*b*) of the core 25 with a predetermined spacing therebetween. In the present embodiment, the plasmon exciting part is composed of the edge part 70*e* and a portion therearound. Surface plasmons are excited on the plasmon exciting part of the plasmon generator 70 through coupling with the evanescent light. The surface plasmons excited on the plasmon exciting part propagate through the edge part 70*e* to reach the near-field light generating part 70*g*. Consequently, the surface plasmons concentrate at the near-field light generating part 70*g*, and the near-field light generating part 70*g* generates near-field light based on the surface plasmons.

A method of manufacturing the thermally-assisted magnetic recording head according to the present embodiment will now be described with reference to FIG. 28A to FIG. 30B. FIG. 28A to FIG. 30B are cross-sectional views each showing part of a stack of layers formed in the process of manufacturing the thermally-assisted magnetic recording head. FIG. 28A to FIG. 30A each show a cross section that intersects the end face 31*a* of the main pole 31 and is perpendicular to the medium facing surface 80 and the top surface 1*a* of the substrate 1. FIG. 28B to FIG. 30B each show a cross section of the stack taken in the position where the medium facing surface 80 is to be formed.

The method of manufacturing the thermally-assisted magnetic recording head according to the present embodiment is the same as that of the second embodiment up to the step of forming the gap layer 27.

Figure 28A:
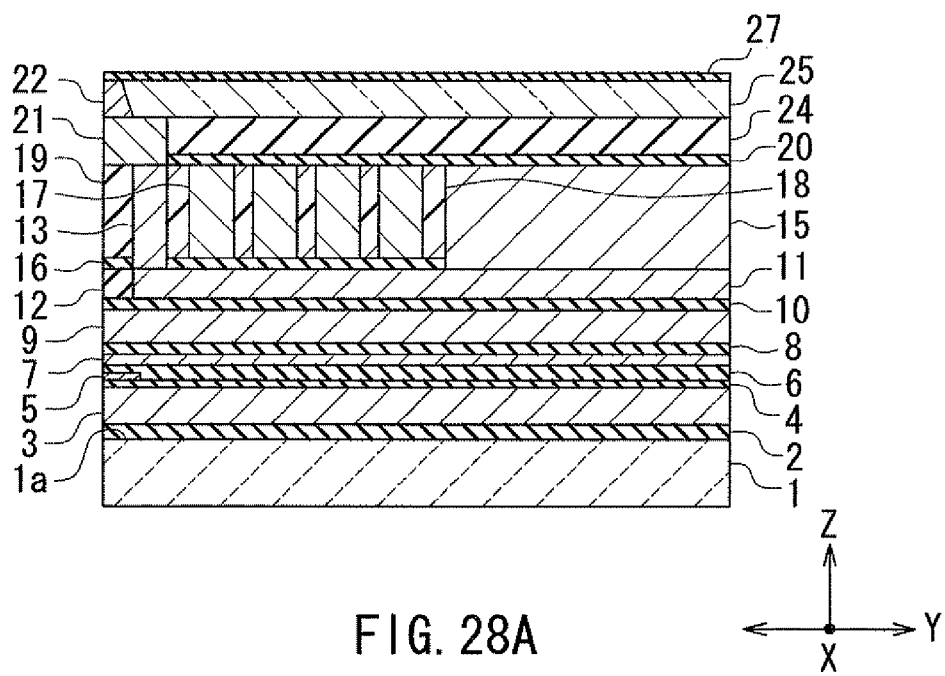
FIG. 28A and FIG. 28B are cross-sectional views showing a step of a method of manufacturing the thermally-assisted magnetic recording head according to the fourth embodiment of the invention.
Figure 28B:
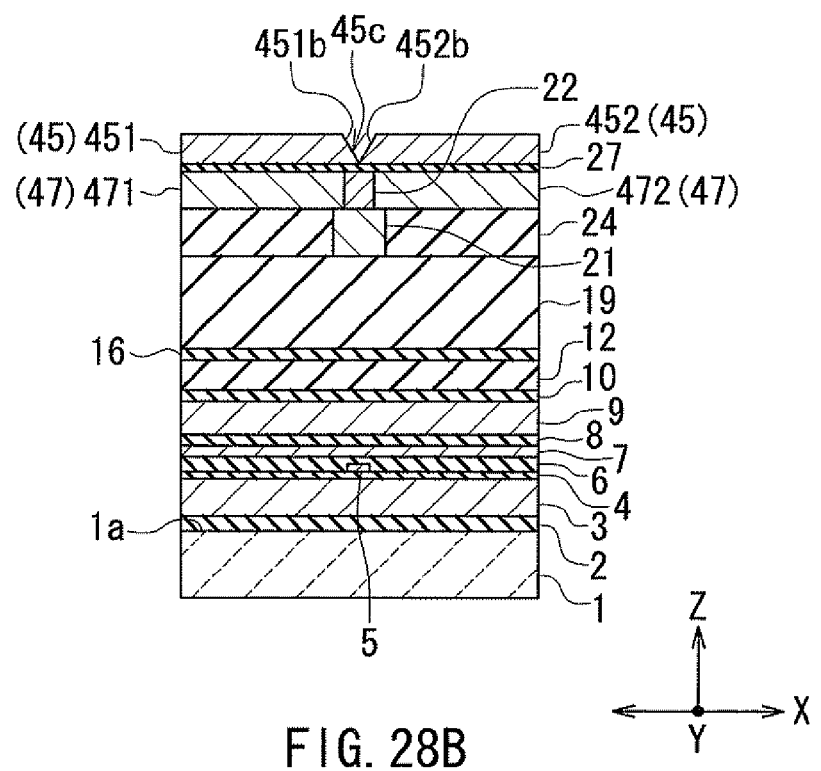

FIG. 28A and FIG. 28B show a step that follows the formation of the gap layer 27. In this step, first, a first heat sink material layer, which is to become the first heat sink layer 45 later, is formed on the gap layer 27.

Next, a not-shown photoresist mask is formed on the first heat sink material layer. The planar shape of the photoresist mask corresponds to the planar shape of the two portions 451 and 452 of the first heat sink layer 45 to be formed later. The first heat sink material layer is then etched by, for example, RIE, using the photoresist mask as the etching mask. This divides the first heat sink material layer into the two portioris 451 and 452 to complete the first heat sink layer 45. When etching the first heat sink material layer, the first heat sink material layer is taper-etched so that the side end face 451*b* of the portion 451 and the side end face 452*b* of the portion 452 are each inclined relative to the direction perpendicular to the top surface 1*a* of the substrate 1. Next, the photoresist mask is removed.

Figure 29A:
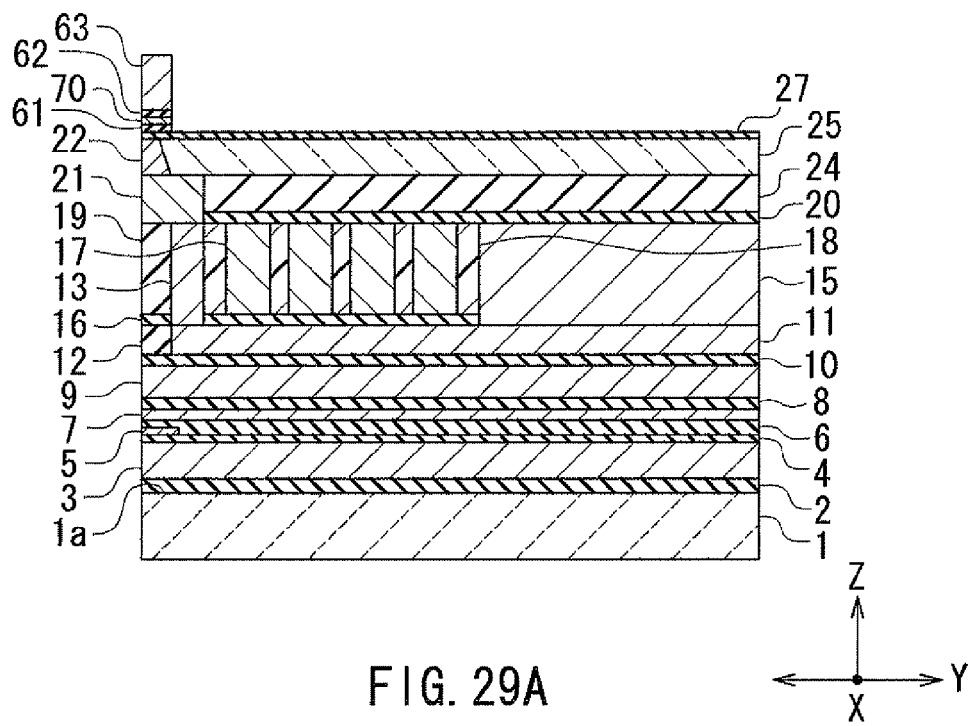
FIG. 29A and FIG. 29B are cross-sectional views showing a step that follows the step shown in FIG. 28A and FIG. 28B.
Figure 29B:
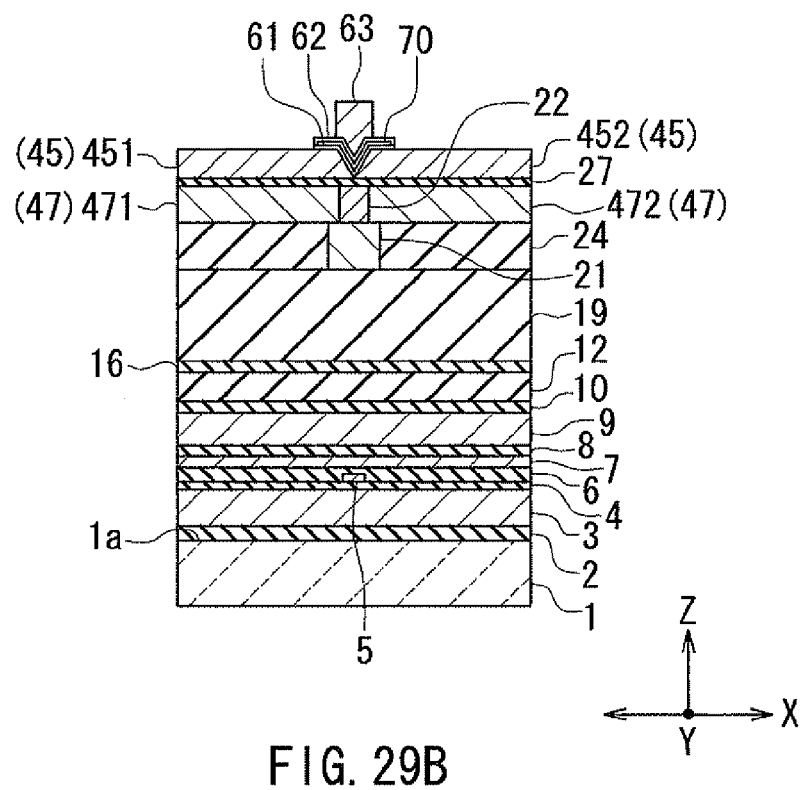

FIG. 29A and FIG. 29B show the next step. In this step, first, the insulating film 61 is formed over the entire top surface of the stack. Next, the plasmon generator 70 is formed on the insulating film 61. The nonmagnetic layer 62 is then formed over the entire top surface of the stack. Next, the main pole 63 is formed on the nonmagnetic layer 62 by frame plating, for example. Then, a not-shown photoresist mask is formed to cover the main pole 63 and part of the nonmagnetic layer 62. Using the photoresist mask as an etching mask, the insulating film 61 and the nonmagnetic layer 62 except portions thereof lying under the main pole 63 and the photoresist mask are then removed by RIE, for example. Then, the photoresist mask is removed.

Figure 30A:
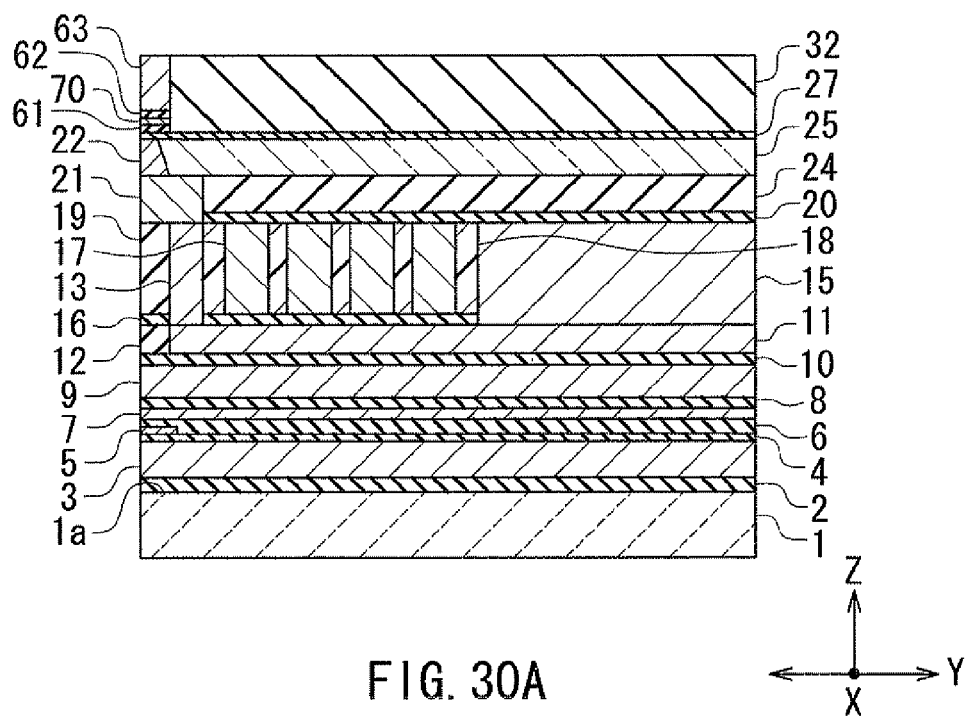
FIG. 30A and FIG. 30B are cross-sectional views showing a step that follows the step shown in FIG. 29A and FIG. 29B.
Figure 30B:
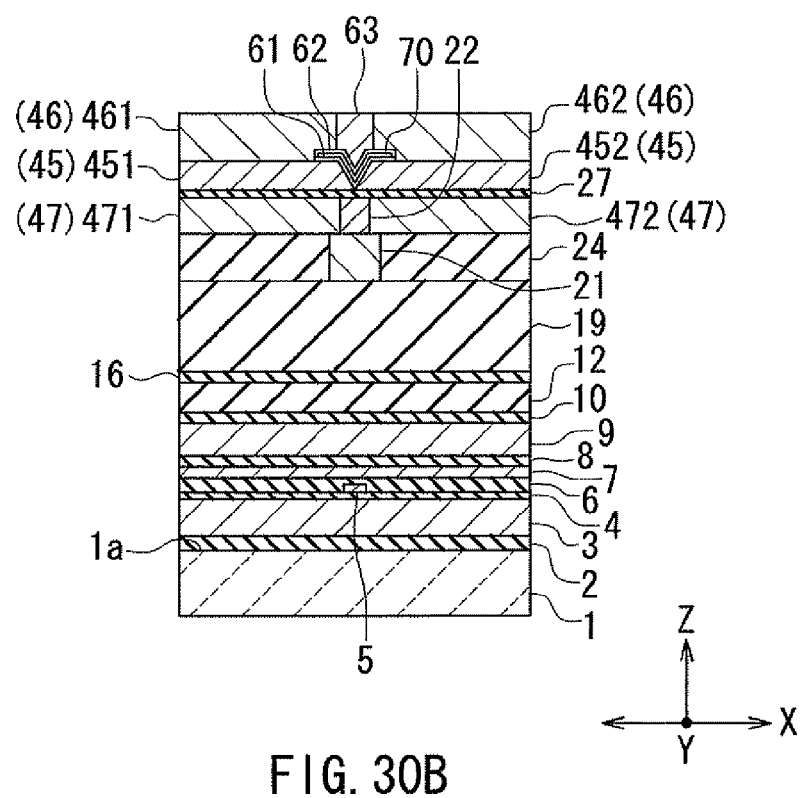

FIG. 30A and FIG. 30B show the next step. In this step, first, a second heat sink material layer, which is to become the second heat sink layer 46 later, is formed over the entire top surface of the stack. The second heat sink material layer is then polished by, for example, CMP, until the main pole 63 is exposed. Next, a not-shown photoresist mask is formed on the second heat sink material layer. The planar shape of the photoresist mask corresponds to the planar shape of the main pole 31 and the planar shape of the two portions 461 and 462 of the second heat sink layer 46 to be formed later. Using the photoresist mask as an etching mask, the second heat sink material layer is then etched by RIE, for example. This divides the second heat sink material layer into the two portions 461 and 462 to complete the second heat sink sink layer 46. Then, the photoresist mask is removed. The subsequent steps are the same as in the second embodiment.

The remainder of configuration, function and effects of the present embodiment are similar to those of the second embodiment.

Modification Example

Figure 31:
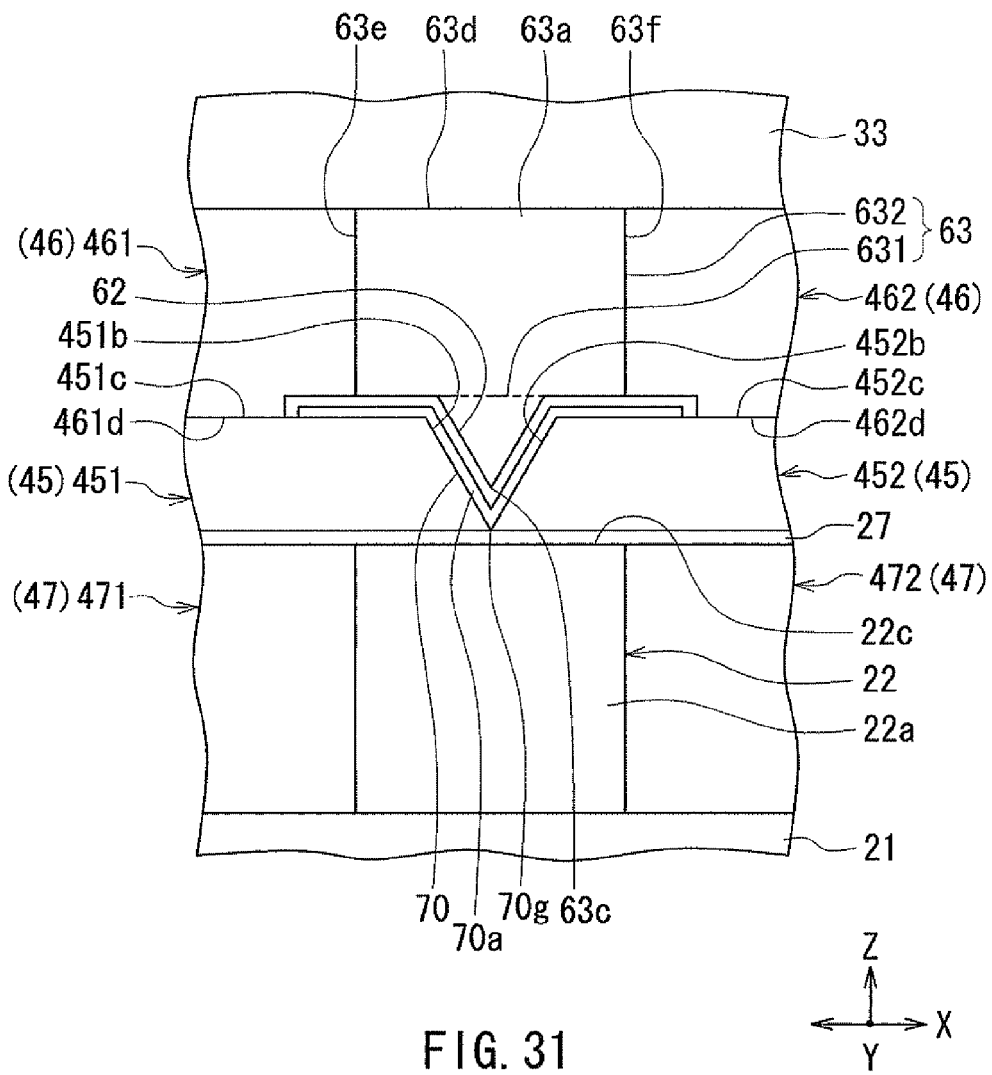
FIG. 31 is a front view showing the main part of a thermally-assisted magnetic recording head of a modification example of the fourth embodiment of the invention.

Reference is now made to FIG. 31 to describe a thermally-assisted magnetic recording head of a modification example of the present embodiment. FIG. 31 is a front view showing the main part of the thermally-assisted magnetic recording head of the modification example of the present embodiment. In the thermally-assisted magnetic recording head of the modification example, the first heat sink layer 45 is made of AlN. Furthermore, in the modification example, the insulating film 61 is not provided, and the first heat sink layer 45 is in contact with the plasmon generator 70. The remainder of configuration of the thermally-assisted magnetic recording head of the modification example is the same as that of the thermally-assisted magnetic recording head shown in FIG. 24 to FIG. 26. According to this modification example, since the first heat sink layer 45 is in contact with the plasmon generator 70, it is possible to enhance the heat dissipation performance of the plasmon generator 70 more effectively.

The present invention is not limited to the foregoing embodiments, and various modifications may be made thereto. For example, as far as the requirements of the appended claims are met, the shapes and the arrangement of the core of the waveguide, the plasmon generator, the main pole, and the first and second heat sink layers are not limited to the examples illustrated in the foregoing embodiments. For example, in the present invention the main pole may be located backward of the plasmon generator in the direction of travel of the recording medium (the Z direction).

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A thermally-assisted magnetic recording head comprising:

a medium facing surface that faces a recording medium;
a main pole that produces a write magnetic field for writing data on the recording medium;
a waveguide including a core through which light propagates, and a cladding that surrounds the core; and
a plasmon generator configured to excite a surface plasmon through coupling with evanescent light that occurs from the core based on the light propagating through the core,
wherein the plasmon generator and the main pole are disposed to align along a direction of travel of the recording medium,
the thermally-assisted magnetic recording head further comprising:
a first heat sink layer having two portions that are located on opposite sides of the plasmon generator in a track width direction;
a second heat sink layer having two portions that are located on opposite sides of the main pole in the track width direction; and
a nonmagnetic layer disposed between the plasmon generator and the main pole, wherein:
the first and second heat sink layers are each made of SiC or AlN; and
the nonmagnetic layer is made of a material that is lower in thermal conductivity at 25° C. than alumina.

2. The thermally-assisted magnetic recording head according to claim 1, wherein the second heat sink layer is in contact with the first heat sink layer.

3. The thermally-assisted magnetic recording head according to claim 1, wherein the nonmagnetic layer is made of $SiO_2$.

4. The thermally-assisted magnetic recording head according to claim 1, wherein the first heat sink layer is made of SiC, the thermally-assisted magnetic recording head further comprising an insulating film disposed between the plasmon generator and the first heat sink layer.

5. The thermally-assisted magnetic recording head according to claim 4, wherein the insulating film is made of alumina.

6. The thermally-assisted magnetic recording head according to claim 1, wherein the first heat sink layer is made of AlN, and is in contact with the plasmon generator.

* * * * *